United States Patent [19]
Okada

[11] Patent Number: 5,706,470
[45] Date of Patent: Jan. 6, 1998

[54] DISK UPDATING LOG RECORDING SYSTEM

[75] Inventor: Hideaki Okada, Tokyo, Japan

[73] Assignee: Mitsubishi Denki Kabushiki Kaisha, Tokyo, Japan

[21] Appl. No.: 673,625

[22] Filed: Jun. 26, 1996

[30] Foreign Application Priority Data

Sep. 27, 1995 [JP] Japan .................................. 7-249734

[51] Int. Cl.⁶ ...................................................... G06F 13/00
[52] U.S. Cl. ................ 395/488; 395/182.13; 395/182.18; 395/489; 395/618; 364/DIG. 1
[58] Field of Search ........................ 395/182.13, 182.18, 395/488, 489, 618

[56] References Cited

U.S. PATENT DOCUMENTS 5,524,205  6/1996  Lomet et al. ..................... 395/182.14
5,636,360  6/1997  Courts et al. ..................... 395/472

FOREIGN PATENT DOCUMENTS

| 0332210 | 9/1989 | European Pat. Off. . |
| 0405859 | 1/1991 | European Pat. Off. . |
| 57-90770 | 6/1982 | Japan ........................... G06F 13/04 |
| 2-42523 | 2/1990 | Japan ........................... G06F 3/06 |
| PCT/GB94/01581 | 7/1985 | WIPO . |

*Primary Examiner*—Frank J. Asta
*Attorney, Agent, or Firm*—Wolf, Greenfield & Sacks, P.C.

[57] ABSTRACT

The present invention carries out a detailed log recording on a disk unit, while deteriorating effects on the disk updating performance are not increased even if the log recording is carried out accurately and in detail in order to prepare for an abrupt cease of the operation in a computer system. A log recording driver is arranged between an operating system in the computer system and disk driver. The log recording driver comprises a log recording table A which carries out log-record not so in detail but accurately, a log recording table B which carries out log-record in detail and a matching flag used for the log recording table B.

14 Claims, 28 Drawing Sheets

LOG RECORDING TABLE B'

LOG RECORDING TABLE B' GROUP MATCHING FLAG

DISK UPDATING LOG RECORDING SYSTEM

BACKGROUND OF THE INVENTION

1. Field of the Invention

The present invention relates to a system for controlling data updating records for external memory devices such as a magnetic disk unit.

2. Description of the Prior Art

In the prior art, since a differential back up is carried out only to the portion where updating has been carried out, a control memory is arranged in a magnetic disk unit so that a disk updating log updated by prosecuting a job is recorded on the control memory, as described in the laid-open Japanese patent publication No. 57-90770, for example.

Also, in another laid-open Japanese patent publication No. 2-42523 which is aiming the differential back up as described above, there is disclosed a disk unit with a disk updating log recording table on which the location of the data updated by prosecuting the job is recorded. This disk unit comprises a log recording table which manages an updated portion existing on a volatile memory per a block, a log recording table which manages an updated portion existing on a non-volatile memory per a truck and a log recording table matching flag existing on the non-volatile memory. This disk unit makes it possible to provide a detailed and economical disk updating log record.

In case of aiming the differential back up as described above, there occurs sometimes a problem that updating is not recorded on the log recording table, even if the requested disk updating is actually carried out. Moreover, in case recording updating log concerned with a disk unit which does not have the above-mentioned update log recording device, the log recording table is necessary to be recorded on another non-volatile memory device, other than the disk unit to which the updating is actually carried out.

Furthermore, in case of log recording to a disk unit which does not have any log recording table, any requested updating on the disk is carried out after the log recording table is recorded on a non-volatile memory device such as a magnetic disk unit, when disk updating is requested, in order to prepare for an abrupt cease of operation in the computer system due to power breakdown or a panic in the operating system and so on.

Since a conventional disk updating log has been recorded in the above-mentioned manner, the smaller the updating unit is, the better the updating unit managed by the log recording tables is small in order to reduce the amount of data back up. On the other hand, in case of carrying out log recording to a disk which does not have any log recording table, the smaller the updating unit is, the more the occasion of recording a log recording table on a disk unit increases. Accordingly, this considerably deteriorates updating performance.

Further, if the recording manage unit is small in case that the capacity of the disk device is large, the log recording table itself becomes large, which makes the available capacity of the main storage small.

It is an object of the present invention to provide a log recording system where the updating unit to be handled by the log recording table is made small to ensure a detailed log recording, a restoration process is accurately carried out in case of any abrupt accident in the computer system. It is other object of the present invention to provide a log recording system where, during in the normal operation, deterioration in the updating performance which is caused by overhead increase due to the small updating unit is restrained to the utmost, without making the available capacity of the main storage small.

SUMMARY OF THE INVENTION

According to one aspect of the invention, a disk updating log recording system comprising a log recording means for managing a record of updated portion of data in a disk unit, wherein, the log recording means comprises: a first log recording table consisted of information areas which corresponds to a plurality of divided areas in the disk unit to record whether or not there is updating, and which is stored both in a main memory device and in the disk unit; a second log recording table consisted of information areas, being smaller than those of the first log recording table, which corresponds to a plurality of divided areas in the disk unit to record whether or not there is updating, which is stored in both of the main memory device and the disk unit; a log recording table matching flag which is stored in both of the main memory device and the disk unit for indicating whether or not the second log recording table in the main memory matches with the second log recording table in the disk unit to each other; a first log recording table updating means for updating the first log recording table in the main memory, and for reflecting the resultant to the first log recording table in the disk unit; a log recording table matching flag updating means for confirming whether or not the second log recording table in the main memory matches with the second log recording table in the disk unit according to the log recording table matching flag in the main memory, and for reflecting the resultant to the log recording table matching flag in the disk unit; and a log recording table identifying means for identifying contents of the second log recording table in the main memory with those of the second log recording table in the disk unit.

According to another aspect of a disk updating log recording system of the present invention, areas managed by the second log recording table is divided into a plurality of groups, and the log recording table matching flag is constructed so that they correspond to the plurality of groups.

According to further aspect of a disk updating log recording system of the present invention, areas managed by the second log recording table is divided into a plurality of groups, and a recording table which constitutes a portion of the divided group is located in the main memory in order that a portion of the recording table of whole the disk areas is written in the main memory.

According to further aspect of a disk updating log recording system of the present invention, areas managed by the second log recording table is divided into a plurality of groups, and a flag is arranged which indicates whether or not recording information which constitutes the groups corresponding to respective groups is loaded into the main memory.

According to further aspect of a disk updating log recording system of the present invention, the disk updating log recording system further comprises a log recording table recovery means for the second log recording table, the log recording table recovery means keeps contents of the second log recording table in the disk unit as it is if the contents of the groups in the main memory are the same as those of the groups in the disk unit, and the log recording table recovery means recovers the second recording table with reference to the first log recording table if the contents of the groups in the main memory are different from those of the groups in the disk unit.

According to further aspect of a disk updating log recording system of the present invention, the disk updating log recording system further comprises a log recording table extension means with connection to the first log recording table and the second log recording table; and the log recording extension means substitutes contents of the first log recording table by contents of the second log recording table, which reconstructs contents of the second log recording table to be recorded by a smaller recording unit than the former contents.

According to further aspect of a disk updating log recording system of the present invention, the disk updating log recording system further comprises at least a third log recording table which have a smaller recording unit than the second recording table; and a log recording table extension means; the log recording extension means makes contents of the second log recording table as those of the first log recording table, the third log recording table which has a smaller recording unit than the second log recording table as the second log recording table, according to a log recording table extension demand.

According to further aspect of a disk updating log recording system of the present invention, the extension process for a log recording table is automatically carried out, if a rate between an updated portion and a non-updated portion exceeds a predetermined rate in the log recording table.

DETAILED DESCRIPTION OF THE PREFERRED EMBODIMENTS

First embodiment

Figure 1:
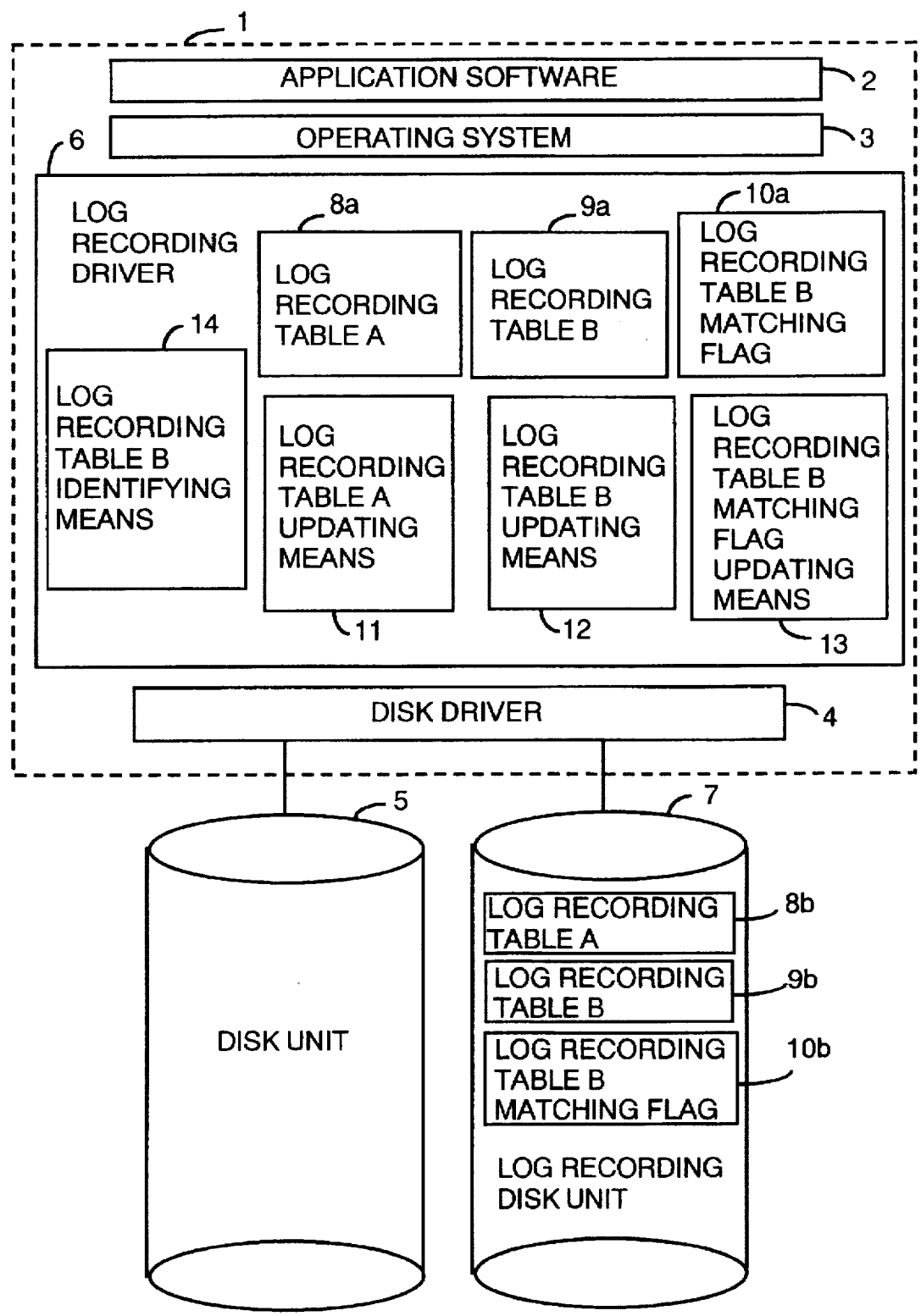
FIG. 1 is a block diagram of a system according to a first embodiment of the present invention.

A first embodiment of the present invention is explained using FIG. 1–FIG. 5. FIG. 1 is a block diagram showing a configuration of the present system. The configuration of FIG. 1 comprises a computer system 1 having a disk unit connecting apparatus, a disk unit 5 which is connected to the computer system 1, an application software 2 which requests for writing on the disk unit 5, an operating system 3 which relays the writing processes between the application software 2 and the disk unit 5, a disk driver 4 which carries out input/output processes to the disk unit 5 and a log recording disk unit 7 which will be mentioned later, and a driver 6 for recording the updating log.

The log recording driver 6 comprises a log recording table A 8a and a log recording table B 9a in the main memory device. Each of the log recording tables A, B includes of a set of flags, which correspond to the records showing whether each divided piece of the disk unit 5 has something written in or not, as it will be mentioned later. The log recording table A 8a has a larger unit than the unit of the log recording table B 9a for recording whether something has been written in the disk or not.

Also in FIG. 1, the system further comprises a disk unit 7 which is used by the log recording driver 6 for maintaining the log records, an image 8b for the log recording table A in the log recording disk unit 7, and an image 9b for the log recording table B in the log recording disk unit 7.

Also in FIG. 1, the log recording driver 6 comprises an updating means 11 for updating the log recording tables A 8a in the log recording driver 6 and the image 8b in the disk unit. The log recording driver 6 further comprises an updating means 12 for updating the log recording tables B 9a in the log recording driver 6 and the image 9b in the disk unit.

The log recording table A updating means 11 guarantees that the contents of the both log recording tables A 8a in the log recording driver and the log recording tables A 8b in the disk unit, are identical. However, the log recording table B updating means 12 does not necessarily guarantees that the contents of the both log recording tables B in the log recording driver and log recording tables B 9b in the disk unit, are identical. For this reason, the log record driver 6 comprises the log recording tables B matching flag 10a which shows whether or not the content of the log recording table B 9a in the log recording driver matches with the contents of the log recording table B in the log recording disk unit 7. The log recording driver 6 further comprises another updating means 13 for the log recording table B matching flags 10a, 10b.

Also in FIG. 1, the log recording driver 6 further comprises an identifying means 14 which instructs to identify the image 9b of the log recording table B in the log recording disk unit 7 with the log recording table B 9a in the log recording driver.

Figure 2:
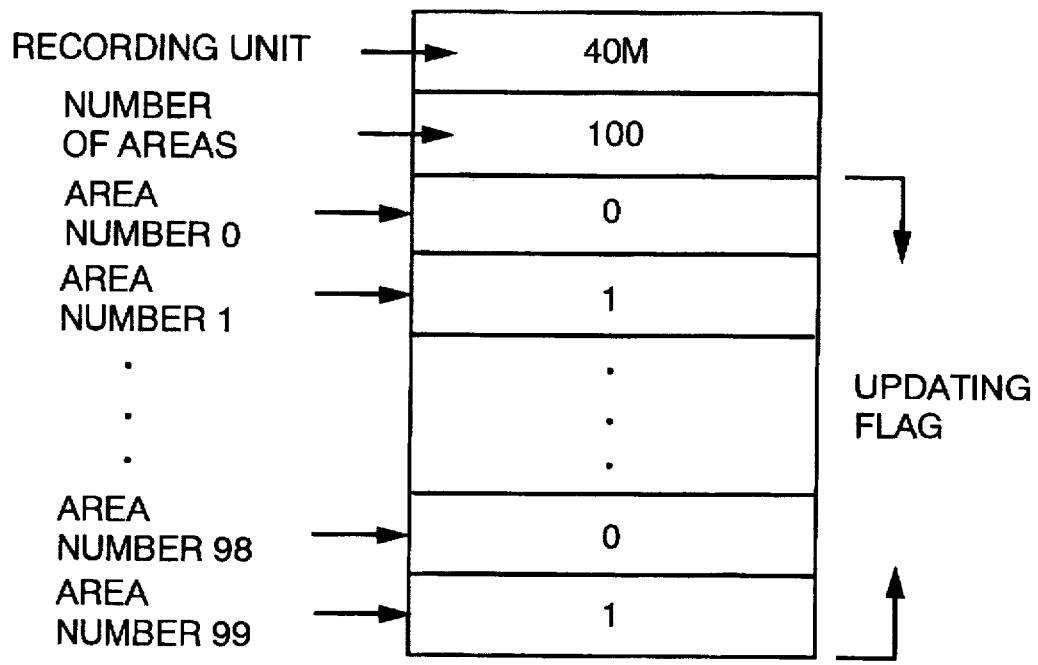
FIG. 2 is a diagram of a log recording table A according to the first embodiment of the present invention.

FIG. 2 shows details of the log recording tables A 8a and 8b. In this embodiment, the disk unit 5 having a capacity of 4 GB is divided into 100 pieces of areas. On the top column of the record table, it indicates a capacity of recording unit area. On the second column from the top of the table, it indicates the number of areas.

The following is an explanation of succeeding columns in the updating flags. For example, the area of the area number 0 indicates that no data updating is carried out since the updating flag is "0", while the area of the area number 99 indicates that a data updating has been carried out since the updating flag is "1".

Figure 3:
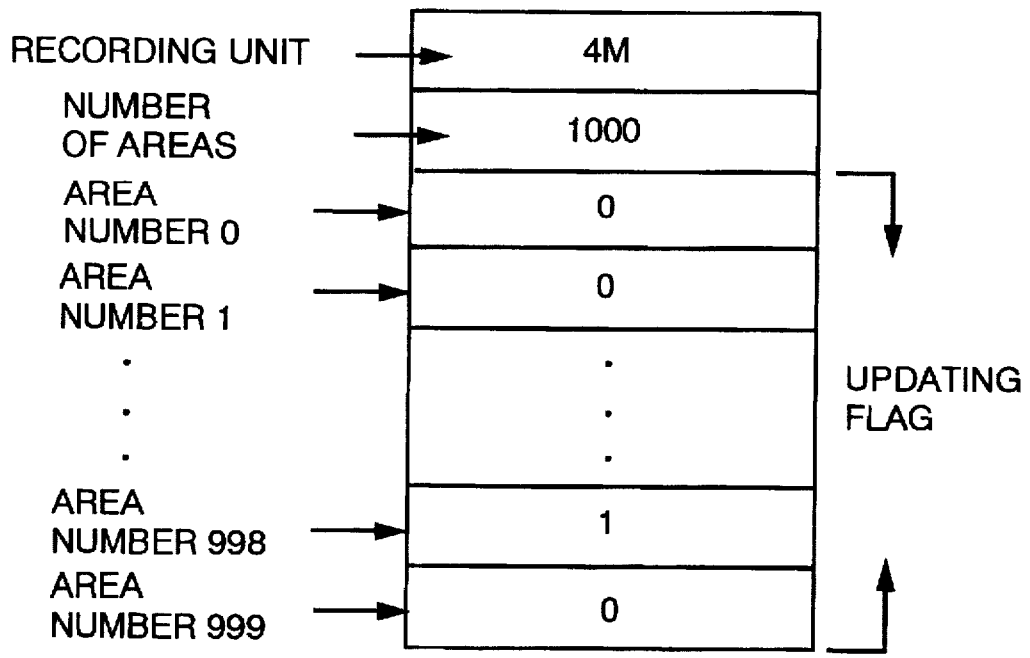
FIG. 3 is a diagram of a log recording table B according to the first embodiment of the present invention.

FIG. 3 shows the details of the log recording tables B 9a and 9b. In this FIG. 3, the log recording tables B 9a and 9b are divided into 1000 pieces of areas, that is ten times as much as that of the log recording table A. Therefore, since the areas of the area numbers 0–9 in the log recording table B correspond to the area of the area number 0 in the log recording table A, updating flags in the area numbers 0–9 are set to "0". On the other hand, at least one of updating flags of the area numbers 990–999 in the log recording table B are set to "1", since the updating flag of the area 99 in the log recording table A is sets to "1". In FIG. 3, an updating flag at the area 998, which is one among the area numbers 990–999, is set to "1".

In the states as shown in FIG. 2 and FIG. 3, if the writing process of the top 1 KB areas of the disk unit 5 is carried out, an updating flag in the area 0 in the log recording table A of FIG. 2 is set to "1" and an updating flag of the area 0 in the log recording table B of FIG. 3 is set to "1".

In the same manner, if the writing process of the last 1 KB areas of the disk unit 5 is carried out, the updating flag of the area 99 in the log recording table A of FIG. 2 maintains "1", while the updating flag of the area 999 in the log recording table B of FIG. 3 is set to "1".

As described above, the log recording table is a table for recording information on whether the writing process is carried out to any divided areas of a disk unit which is divided into a plurality of areas for the log recording.

Also, the matching flags 10a, 10b show "1" when the contents of the both log recording tables B 9a and 9b are matched, otherwise, they show "0".

Before explaining the operation of the log recording driver 6, a process flow to write a data in the disk unit 5 by the application software 2 is explained below.

When there is no log recording driver 6, the application software 2 requests the operating system 3 to write the processed data in the disk unit 5. The operating system 3 then requests the disk driver 4 to write the processed data in the disk unit 5, and the disk driver 4 writes the data in the disk unit 5.

Here, it is assumed that the log recording driver 6 is realized by a virtual disk driver. In other words, when seeing the log recording driver 6 from the operating system 3, the log recording driver 6 writes-in and reads-out via an interface in the same manner as carried out in the normal disk driver 4. Even when there is the log recording driver 6, the application software 2 requests the operating system 3 to write the processed data in the disk unit 5 in the same way when there is no log record driver 6. The operating system 3 then requests the log recording driver 6 to write the data in the disk unit 5.

The log recording driver 6 uses the log recording table A updating means 11, the log recording table B updating means 12 or the log recording table B matching flag updating means 13, and the log recording driver 6 requests the disk driver 4 to carry out the writing process requested by the application software 2 via the operating system 3. The disk driver 4 then carries out the requested process to write the data in the disk unit 5.

Figure 4A:
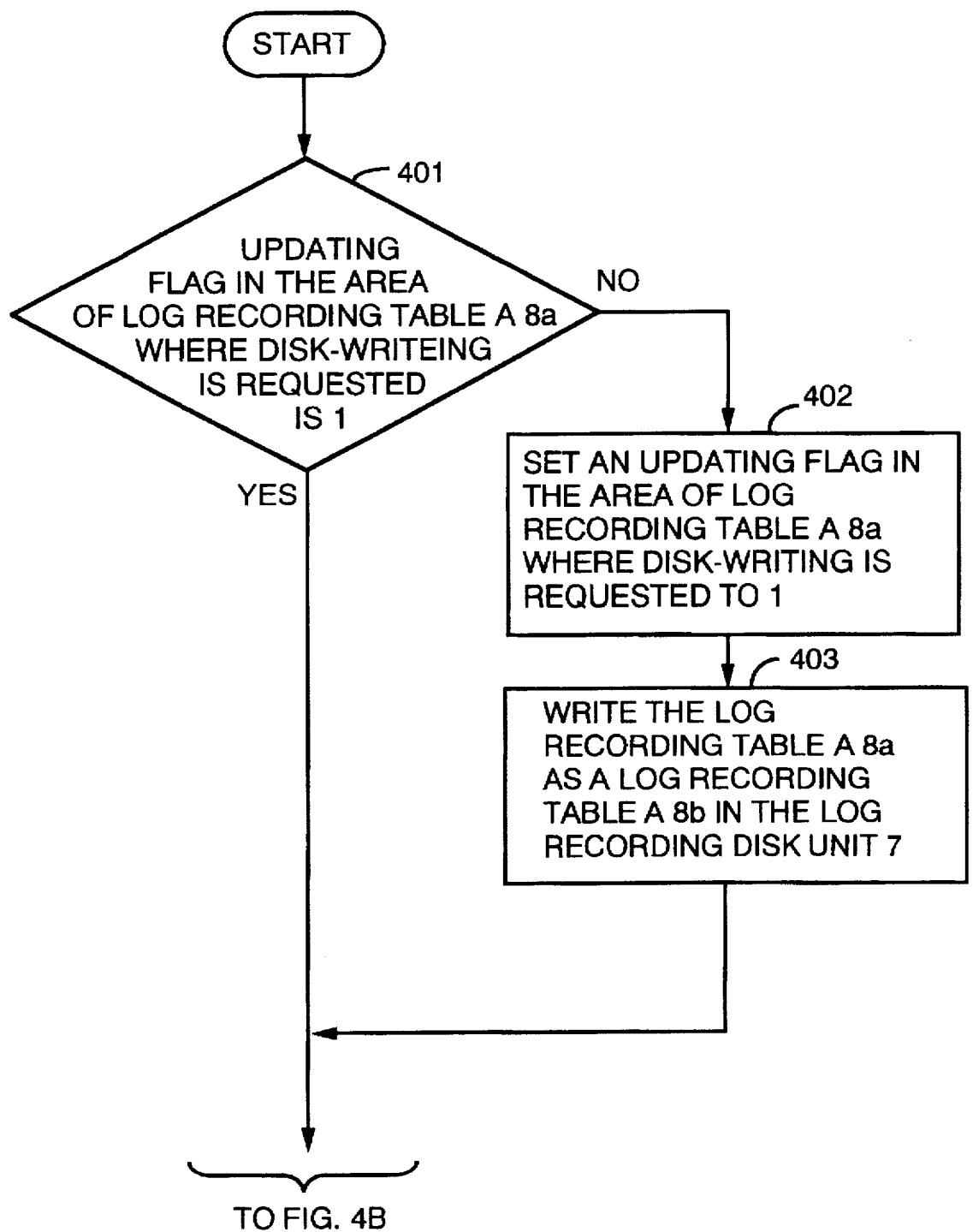
FIGS. 4A, 4B are flow charts showing an operation of a log recording driver according to the first embodiment of the present invention.
Figure 4B:
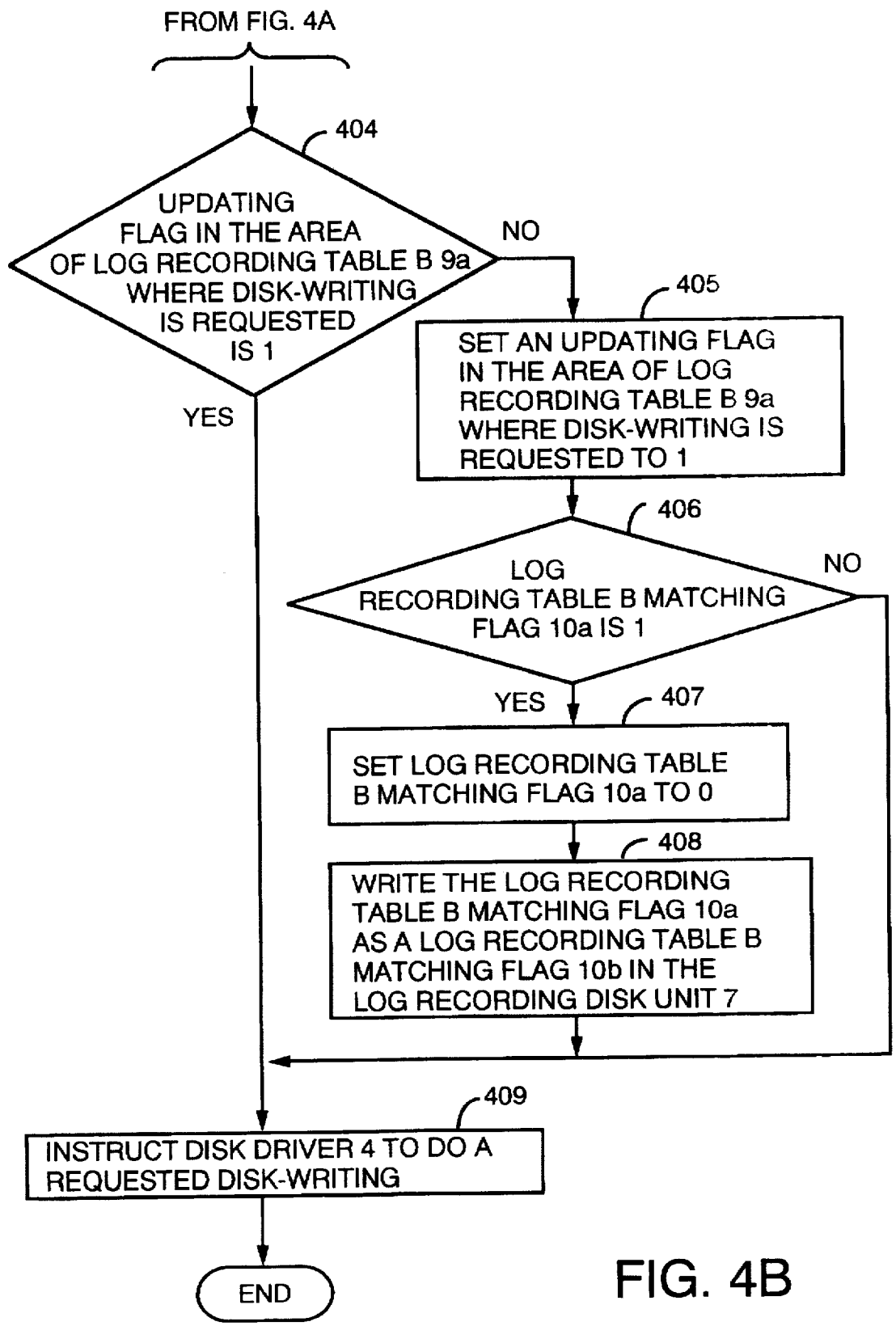
Figure 5:
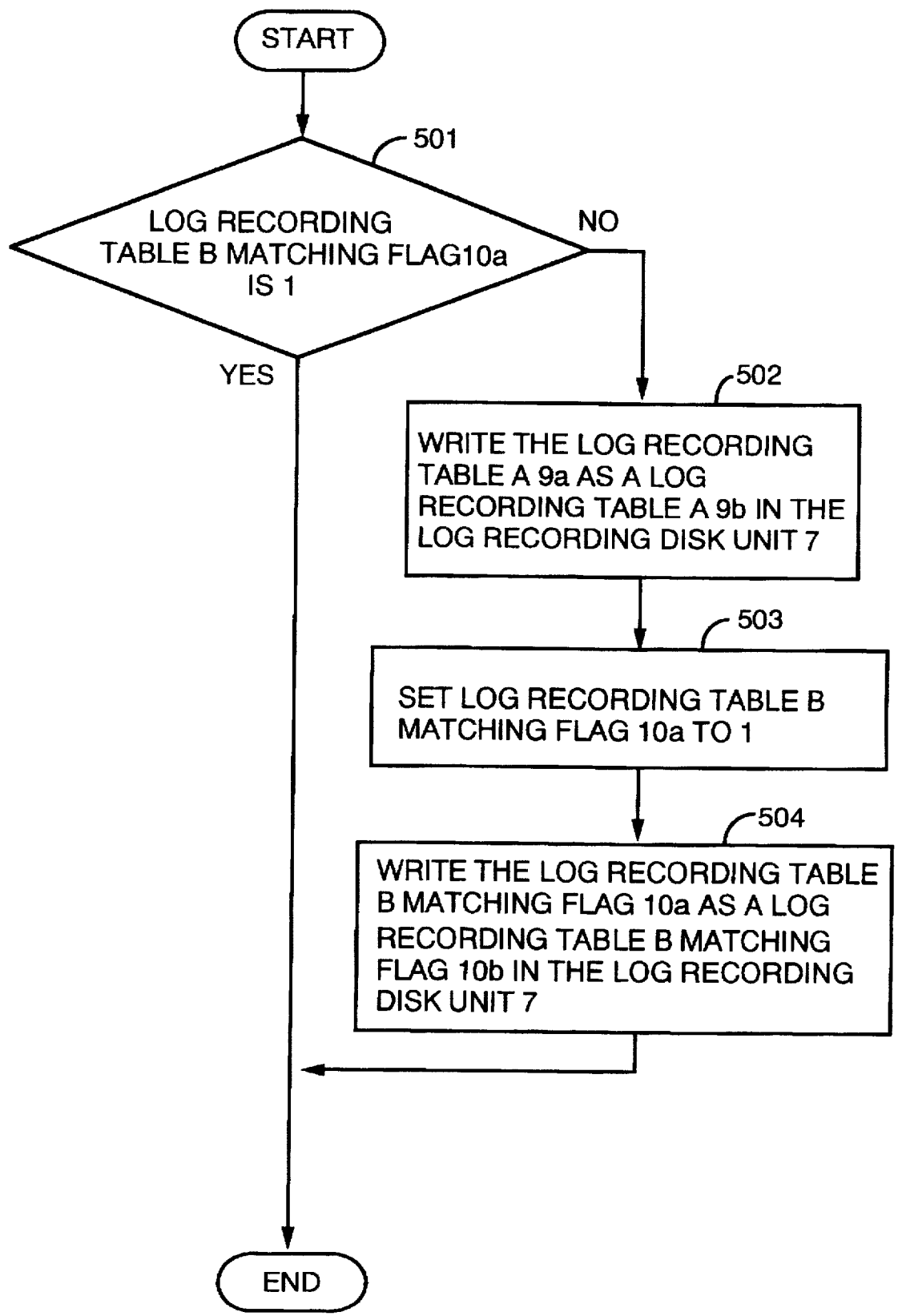
FIG. 5 is a flow chart showing an operation of a log recording table B identifying means according to the first embodiment of the present invention.

The following is a detailed explanation on an operation of the log recording driver 6 with references to FIG. 4 and FIG. 5. FIG. 4 is a flow chart showing an operation of the log recording driver 6. Receiving a request from the operating system 3 to write in the disk unit 5, the log recording driver 6 calls for the log recording table A updating means 11. The log recording table A updating means 11 then confirms whether a flag is set to "1" at a place of the log recording table A 8a on the disk to which the write-in is requested (step 401). If the updating flag is not "1", namely none of the updating has been done yet, an updating flag is set to "1" in that place to record that it has been updated (step 402). After the updating information has been written therein, the log recording table A 8a is then written in the log recording disk unit 7 as a log recording table A 8b (step 403).

The log recording driver 6 then calls for the log recording table B updating means 12. The log recording table B updating means 12 confirms whether a flag is set to "1" at a place of the log recording table B 9a on the disk to which the write-in is requested (step 404). If the updating flag is not "1", namely none of the updating has been done yet, an updating flag is set to "1" in that place of the log recording table B 9a to record that it has been updated (step 405). The log recording driver 6 then calls for the log recording table B matching flag updating means 13.

The log recording table B matching flag updating means 13 confirms whether the log recording table B matching flag 10a is set to "1" or not (step 406). If the updating flag is set to "1", namely both of the log recording tables B is matched to each other, the log recording table B matching flag 10a is set to "0", namely the log recording table B matching flag 10a is set to mismatched state (step 407). The log recording table B matching flag 10a is then written in the log recording disk unit 7 as a log recording table B matching flag 10b (step 408).

Finally, the log recording driver 6 requests the disk driver 4 to write in the disk unit 5, which is requested by the application software 2 via the operating system 3.

It is evident from the above description that the contents of both the log recording tables A 8a and 8b and both the log recording tables B matching flags 10a and 10b always match to each other, while the contents of the log recording tables B 9a and 9b do not necessarily match to each other, they rarely correspond to each other. Accordingly, the identifying means 14 is necessary for the log recording tables B to identify the log recording tables B 9a and 9b to each other.

The log recording table B identifying means 14 is explained using a flow chart of FIG. 5. The log recording table B identifying means 14 is called before the computer system 1 stops, or after a job using the disk unit 5 completes.

When the log recording table B identifying means 14 receives a request for identifying the log recording tables B from a user or a manager of the computer system 1, the log recording driver 6 calls for the log recording table B identifying means 14.

The log recording table B identifying means 14 confirms whether the log recording table B matching flag 10a is "1" or not, in other words, whether the contents of the both log recording tables B 9a and 9b match to each other (step 501). If the updating flag is not set to "1", namely the both log recording tables B do not match to each other, the identifying means 14 calls for the log recording table B updating means 12 to write the log recording table 9a into the log recording disk unit 7 as a log recording table B 9b (step 502). The identifying means 14 then calls for the log recording table B matching flag updating means 13.

The log recording table B matching flag updating means 13 sets the log recording table B matching flag 10a to "1", namely, to a matched state (step 503), then writes the log recording table B matching flag 10a into the log recording disk unit 7 as a log recording table B matching flag 10b (step 504).

One usage example is shown in order to explain the effect of the present embodiment. The computer system 1 is started every morning and ceased when each day's business closes.

Right before the cease of the business operation, the log recording table B identifying means 14 carries out the identifying operation between the log recording tables B 9a and 9b. When a business operation is started, the log recording table A 8b, the log recording table B 9b and the log recording table B matching flag 10b are read out and they are set as a log recording table A 8a, a log recording table B 9a, and the matching flag 10a, respectively.

In this case, it is assumed that a tape device carries out a back up of the disk unit 5 once in a week for the portion where the updating has been carried out by the business processing of the week, and carries out the back up of all the data in the disk unit 5 once in a month. A log recording disk driver is introduced to the areas where the back up of the updated disk unit 5 is carried out. The log recording table B 9a is used for the above purpose.

Referring the log recording table B 9a, the back up is carried out only to the portion where the updating flag is set to "1", in other words, to the portion where something has been written in. After the back up, the updating flags in both the log recording tables A and B are initialized to "0". Here, the log recording table B 9a is preferable than the log recording table A 8a, because it can be recognized whether the data are written in by a smaller unit, which reduces the capacity of the data back up.

If the operation of the computer system 1 is abnormally ceased due to some accident when both the log recording tables B 9a and 9b do not match to each other, the back up is made by using the log recording table A 8a. In other words, when the system is restarted after its abnormal operation stop, the log recording table B matching flag 10b indicates "0", that is, a mismatched state. Therefore, in the log recording driver 6, only the operation of the log recording table A updating means 11 operates then after, and the log recording table A 8a is used for the weekend back up. This is because it is guaranteed that the contents of both the log recording tables A 8a, 8b always identify to each other. Using the log recording table 8a increases the back up load than using the log recording table 9a and generates some redundant back up. However, compared with the case for backing up all data, the amount of the data back up is considerably small and an effective back-up is carried out.

The computer system which has only one log recording table is explained using an example of the prior art. In order to reduce the capacity of back up in the same way as mentioned in the present embodiment, it is necessary to record whether there is any writing by the same area unit as those of the log recording tables B 9a and 9b. If one log recording table tries to always keep the contents as same as those of these log recording tables A of 8a and 8b of the present invention, the number of writing the log recording table into the log recording disk unit 7 increases. According to the present embodiment, in the worst case, namely when all areas in the disk driver 6 has been updated, the number of writing the log recording table into the log recording disk unit 7 is 100, which is equal to the area numbers of the log recording tables A of 8a and 8b, except the writing carried out before every day's operation stop. On the other hand, in case of the prior art, the number of writing the log recording table into the log recording disk unit 7 is 1000, which is equal to the area number of the log recording tables B.

Moreover, according to the present embodiment, since the update of the log recording table B 9a is carried out only in the main memory device, this significantly reduces an overhead compared with the prior art which is accompanied by the writing process to the log recording disk unit 7. If one log recording table tries not to keep the contents as same as those of these log recording tables A of 8a and 8b of the present invention, the one log recording table only caries out back up of the whole disk unit 5, if an abrupt abnormal operation cease is occurred in the computer system in a certain week. Accordingly, it is impossible to realize an effective back up processing which eliminates a wasteful data back up.

As described above, according to the present embodiment, when there is no abrupt abnormal operational cease in the computer system, the overhead for accessing to the disk is reduced, while even when the computer system operation is abruptly ceased due to some abnormality, the amount of back-up data is reduced.

Embodiment 2

Figure 6:
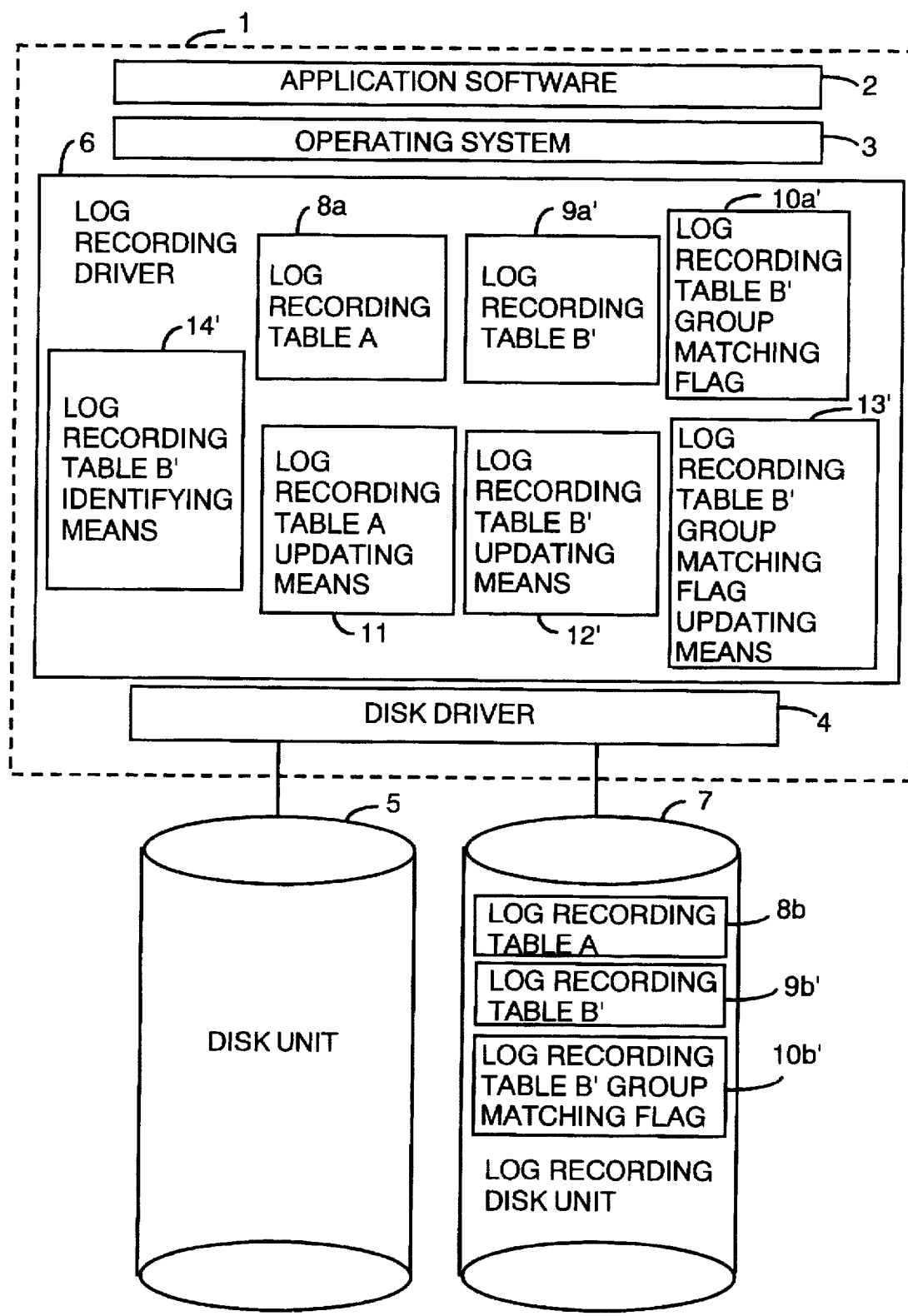
FIG. 6 is a block diagram of a system according to a second embodiment of the present invention.

A second embodiment of the present invention is explained using FIG. 6~FIG. 9. FIG. 6 is a block diagram of the system for the second embodiment. It is fundamentally the same as the system configuration of FIG. 1.

Figure 7:
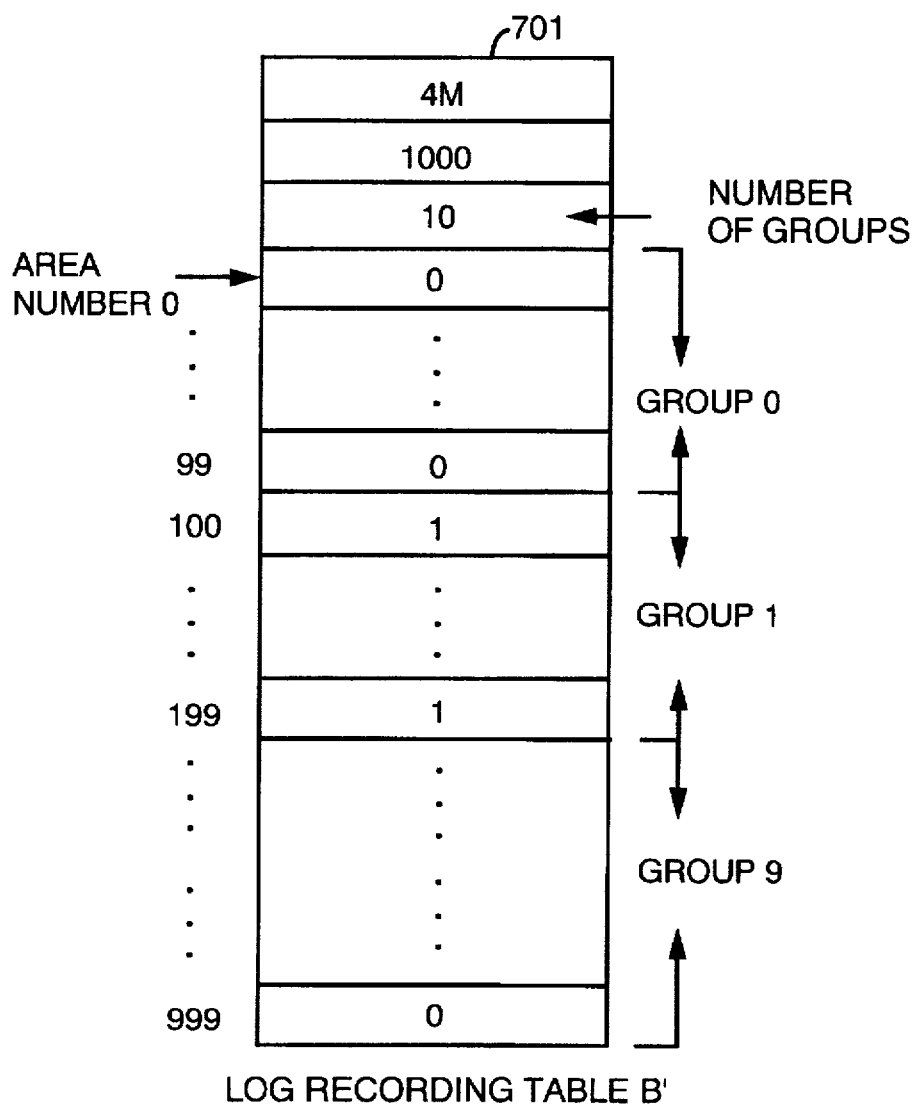
FIG. 7 is a diagram of a log recording table B' and a group log recording table B' group matching flag according to the second embodiment.
Figure 7:
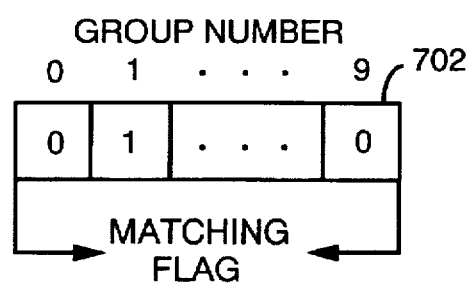

In FIG. 6, log recording tables 9a' and 9b' are defined as a log recording table B' 701 in FIG. 7. Log recording table B' group matching flags 10a' and 10b' are defined as a log recording table B' group matching flag 702 in FIG. 7. Also in FIG. 6, the log recording driver 6 comprises a log recording table B' updating means 12', a log recording table B' group matching flag updating means 13' and a log recording table B' identifying means 14'.

The log recording table B' 701 and the log recording table B' group matching flag 702 are explained using FIG. 7. The third column in the log recording table B' 701 indicates the number of groups, which number is 10 in this embodiment, that is, the log recording table B' is divided into 10 groups.

The log recording table B' group matching flag 702 has matching flags corresponding to respective groups of the log recording table B' 701. In this embodiment, the group having a group number 1 corresponding to the areas 100~199 in the log recording table B' 701 indicates that the updating flag is "1". With regard to this group having the updating flag "1", the image 9a' of the log recording table B' in the main memory matches with the image 9b' in the log recording table B' in the log recording disk unit 7 to each other. On the other hand, with regard to groups having the updating flag "0", namely, the groups having the group numbers 0 or 9, corresponding two images do not match to each other.

In other words, according to this embodiment, the log recording table B' is written into the log recording disk unit 7 by the unit of these groups which exist on the log recording table B'.

Figure 8A:
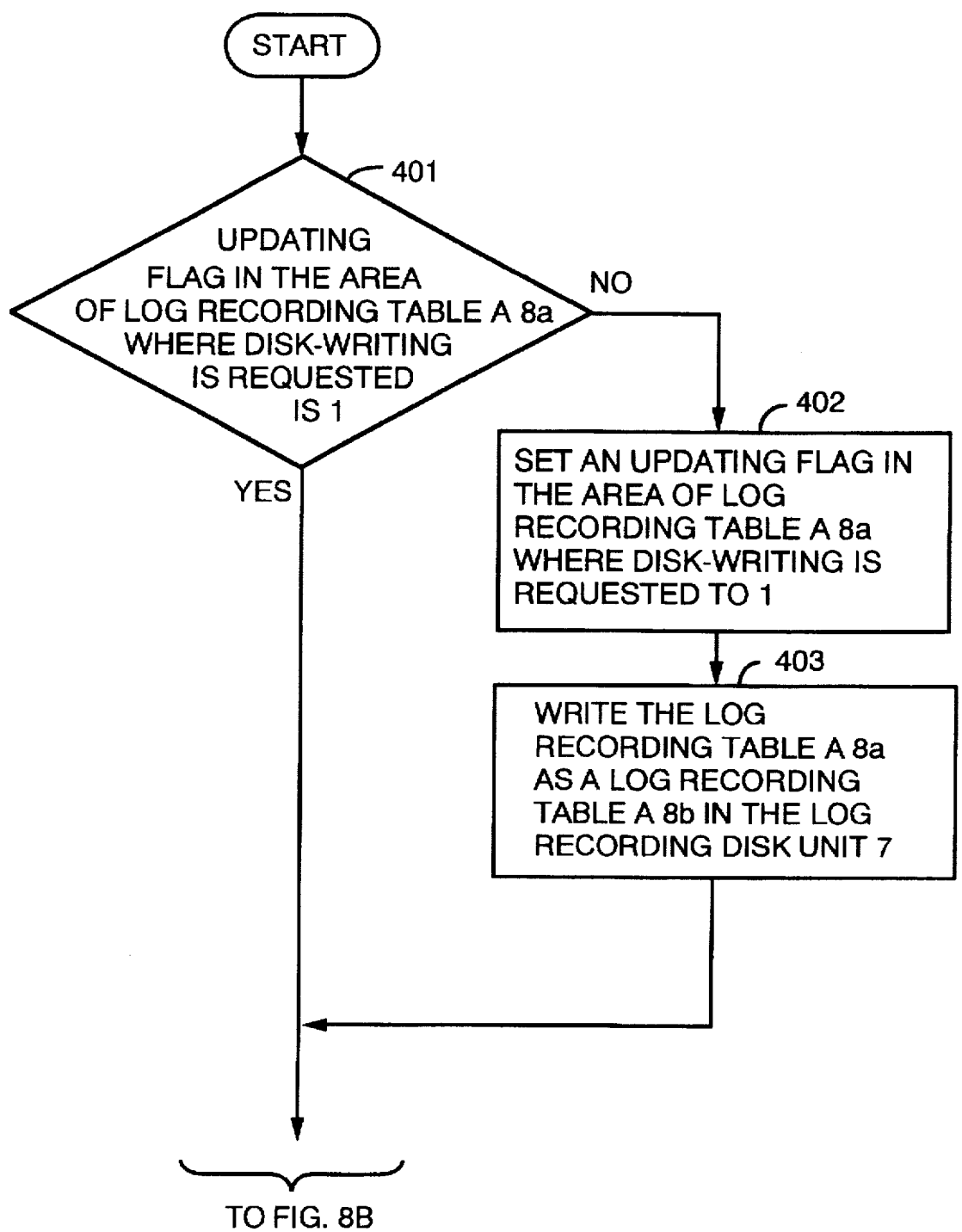
FIGS. 8A, 8B are flow charts showing an operation of a log recording driver according to the second embodiment of the present invention.
Figure 8B:
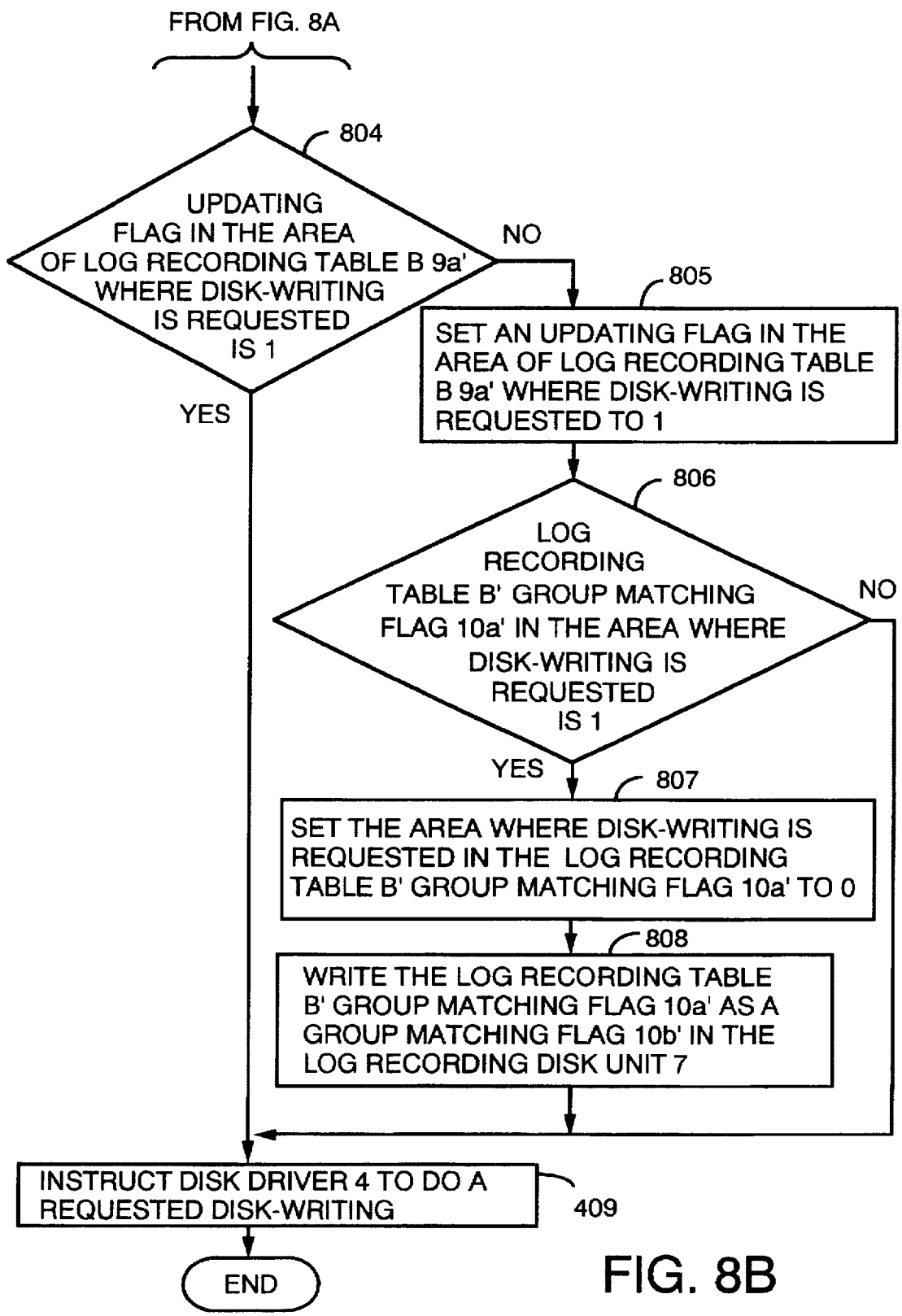

An operation of the log recording driver is explained using FIG. 8. After process the log recording table A updating means 11 in the same manner as that of the first embodiment (step 401, step 402, step 403), the log recording driver 6 calls for the log recording table B' updating means 12'.

The log recording table B' updating means 12' confirms whether the updating flag in the disk writing request area is "1" or not in the log recording table B' 9a' (step 804). If the updating flag is not "1", namely the updating flag has not yet updated, the updating flag is set to "1" in the area of the log recording table B' 9a' in the disk writing request area (step 805). The log recording driver 6 then calls for the log recording table B' group matching flag updating means 13'.

The log recording table B' group matching flag updating means 13' confirms whether the log recording table B' group matching flag 10a' is set to "1" or not in the group to which the above-mentioned disk writing request area belongs (step 806). If the flag 10a' is set to "1", which stands for "matched", the log recording table B group matching flag 10a' in the group to which the disk writing request area belongs is set to "0" (step 807). The log recording table B' group matching flag 10a' is then written in the log recording disk unit 7 as a group matching flag 10b' (step 808). Finally, the log recording driver 6 requests the disk driver 4 to process the requested disk writing (step 409).

Figure 9:
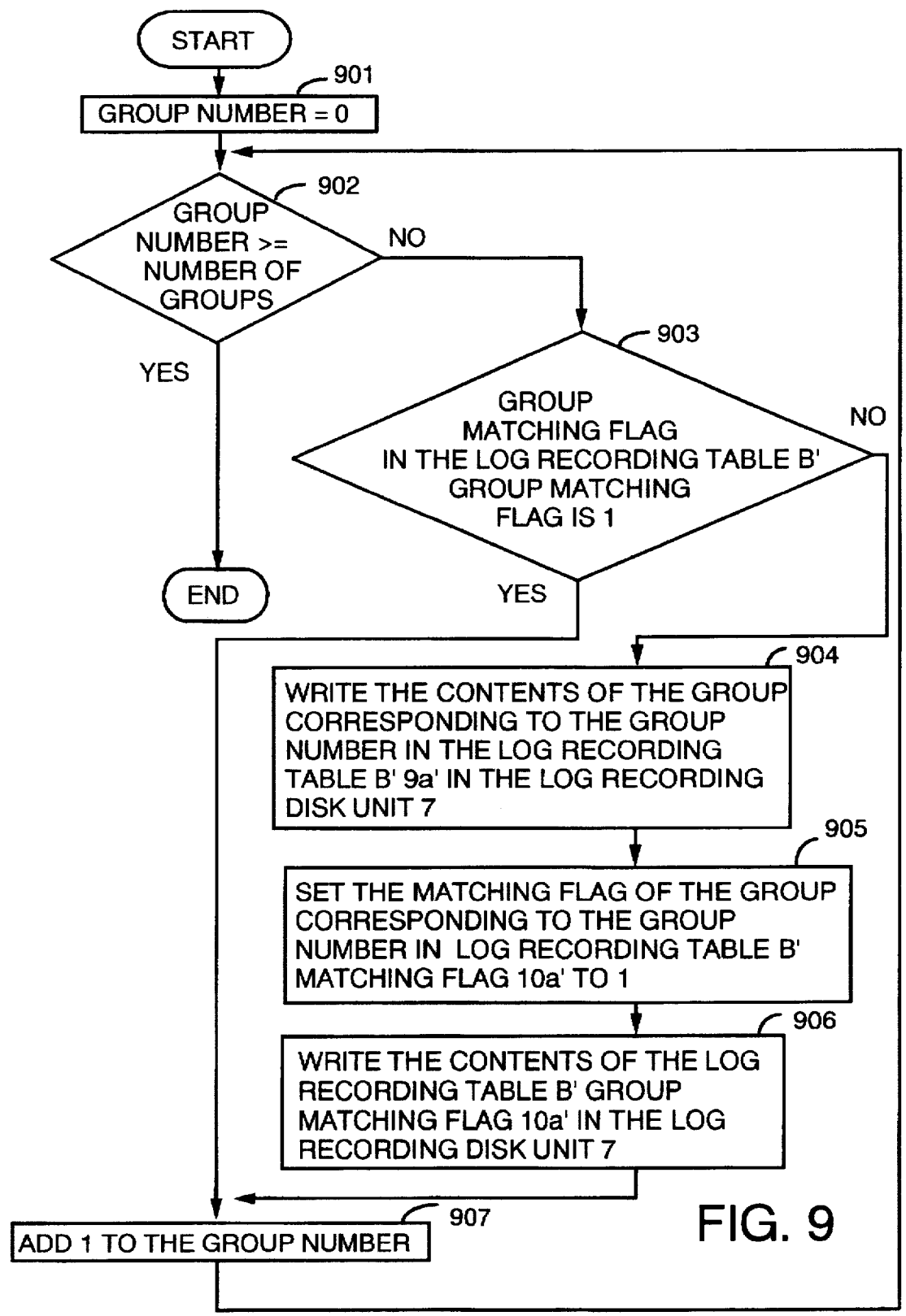
FIG. 9 is a flow chart showing an operation of a log recording table B' identifying means according to the second embodiment of the present invention.

The log recording table B' identifying means 14' is explained using a flow chart of FIG. 9. When receiving an identifying request, the log recording table B' identifying means 14' initializes the group numbers to "0" which are necessary to be identified (step 901). If the above-mentioned group number of that group which are necessary to be identified, is more than the number of the groups (step 902), the process comes to an end. Otherwise, the log recording table B' identifying means 14' confirms whether the matching flags of that group number, which are necessary to be identified, of the log recording table B' group matching flag 10a' are set to "1" or not (step 903). If the flag is set to "1", that is, the flag stands for "matched", the log recording table B' identifying means 14' adds "1" to the group number of the group numbers which are necessary to be identified (step 907). The process then goes back to the step 902.

If the flag "1" is not set therein, the log recording table B' identifying means 14' writes a portion belonging to the group of the group numbers, which are necessary to be identified, in the log recording table B' 9a', into the log recording disk unit 7 (step 904). The log recording table B' identifying means 14' then sets a matching flag of a group of the group numbers, which are necessary to be identified, of the log recording table B' group matching flag 10a' to "1" (step 905), and then writes the log recording tables B' group matching flag 10a' into the log recording disk unit 7 (step 906), after then the process goes to the step 907.

As explained above, the difference between the first embodiment and the second embodiment lies in that a group concept is introduced and the matching flags is provided to each log recording table B. In order to explain the effect of the present embodiment, one usage example of the system is assumed in the below.

In the second embodiment, in addition to the first embodiment, it is further assumed that identifying of the log recording table B' is carried out for every predetermined hours (for example, for every one hour), and also at the time of end of job. In case of carrying it out for every one hour, only about 10 times overheads occur in a day, where writing process to the disk is required for identifying the log recording tables B'. If the operation of the computer system 1 is abruptly ceased due to some abnormality, the whole log recording table B may become out of use in case of the first embodiment. However in case of the present second embodiment, it is only the group(s) in the log recording table B' which has been updated during less than an hour that may become out of use. Only the updated groups of the log recording table B' can not be used from the time when the last identifying of the log recording table B' is carried out to the time when the computer system 1 stops by the abrupt cease of the operation due to the abnormality, that is, less than an hour in this case, for example. In other words, the groups of the log recording table B' which have not been updated during that time, that is, the groups in which the log recording table B' group matching flag is "1", can use of the information on the log recording table B' 9b' with reliability. Accordingly the present second embodiment can realize a log recording means durable enough to accidents with less amount of overhead. Even if a failure occurs, the system of this embodiment ensures the reduction in the amount of the data back up.

Embodiment 3

Figure 10:
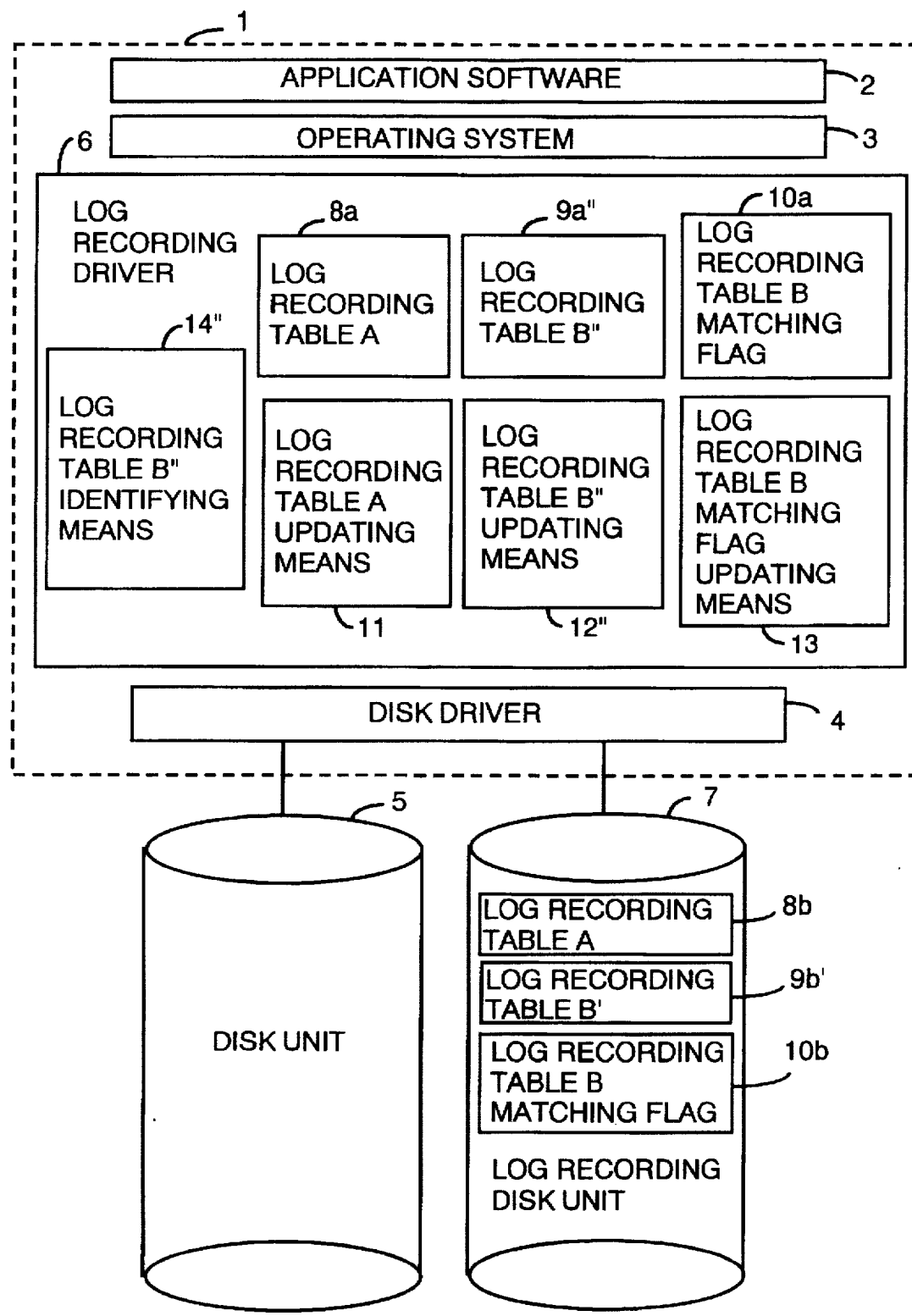
FIG. 10 is a block diagram of a system according to a third embodiment of the present invention.
Figure 11:
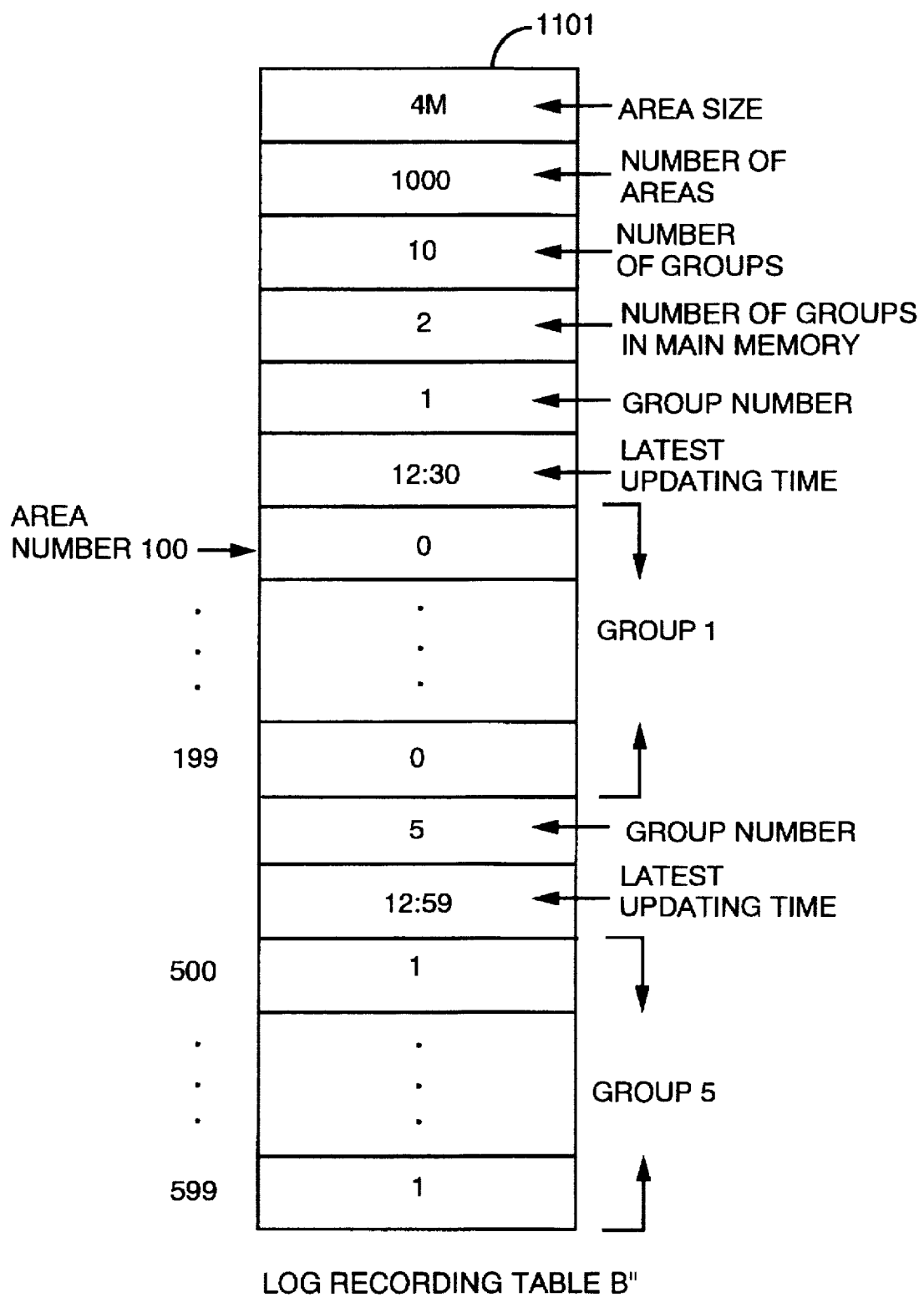
FIG. 11 is a diagram of a log recording table B" according to the third embodiment of the present invention.

A third embodiment of the present invention is explained using FIG. 10–FIG. 13. FIG. 10 is a block diagram showing a configuration of the present embodiment. A log recording table 9a" and its details in FIG. 10 are shown in FIG. 11. The log recording table 9b' in FIG. 10 is the same as the log recording table B' 701 in FIG. 7. The log recording driver 6 also comprises a log recording tables B" updating means 12" and a log recording tables B" identifying means 14". Compared with the configuration of FIG. 1, all the log recording tables B in FIG. 1 except the log recording table B' 9b' on the log recording magnetic disk unit 7 are replaced by the log recording tables B".

The log recording table B" is explained using FIG. 11. A group concept is introduced into the log recording table B" 1101 in FIG. 11. The log recording table B" includes an area size of the recording unit, an area number, and number of groups from the top in order. It is followed by number of groups cashed in the main memory and its group number, a latest updating time and updating flags in the areas which are included in that groups. The same contents with regard to the next group are recorded below.

In case of the present embodiment, the log recording table B' 9b' in the log recording disk unit 7 is divided into 10 groups. But, the number of groups in the main memory is "2", which means that only the two groups out of 10 groups exist in the main memory. In other words, the log recording table B" 9a" has a capacity equal to that of the two groups out of the 10 groups to which the log recording table B' 701 is divided. The updating is carried out using this log recording table B" 9a" by cashing the contents in the log recording table B' 9b'.

According to this embodiment, two groups are cashed in the main memory. FIG. 11 shows that two groups of the group numbers 1 and 5 are cashed at present. The LRU algorithm is used for the cashing. The latest updating time is recorded for each group which is cashed in the log recording table B" 1101.

Figure 12A:
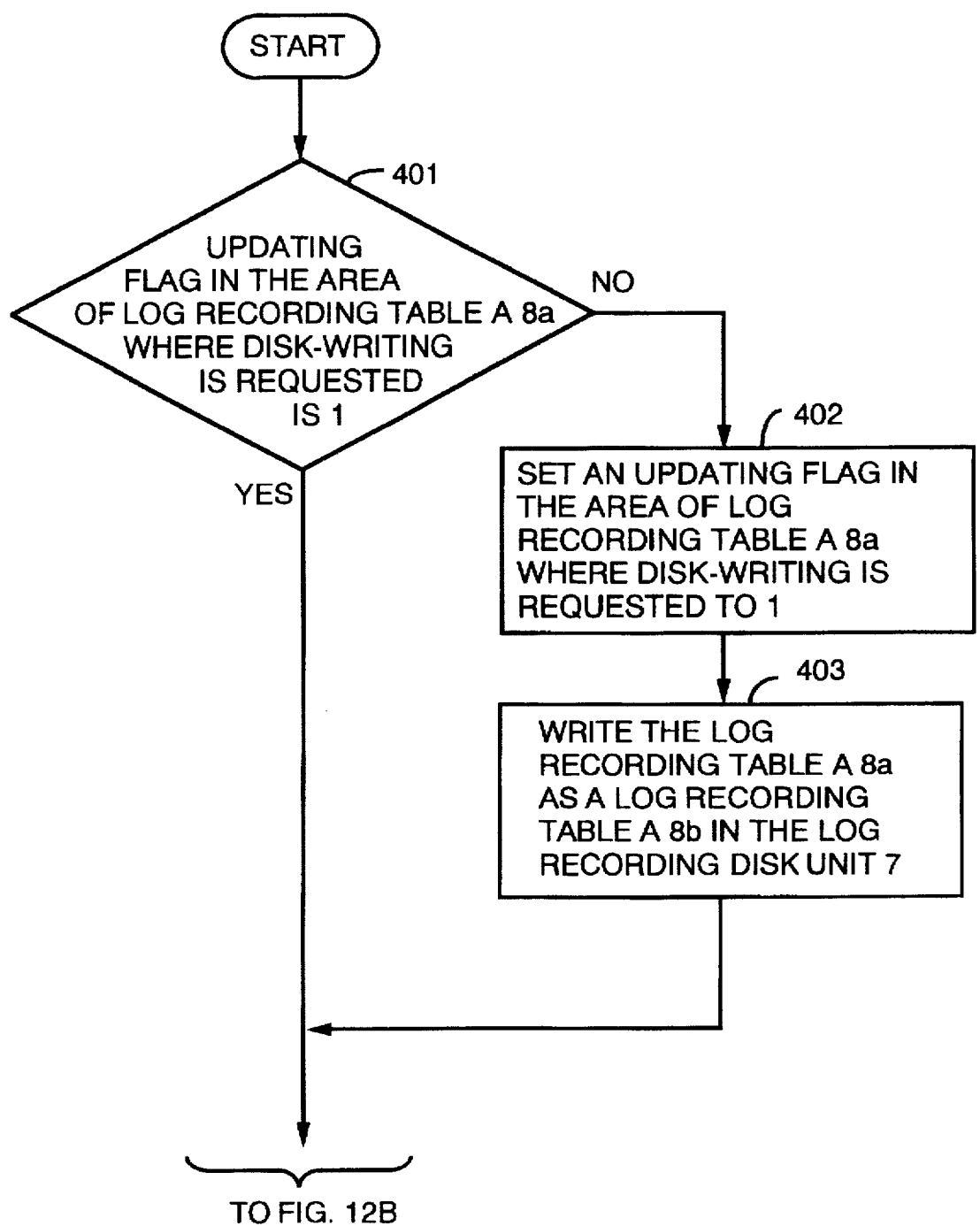
FIGS. 12A, 12B, 12C are flow charts showing an operation of a log recording driver according to the third embodiment of the present invention.
Figure 12B:
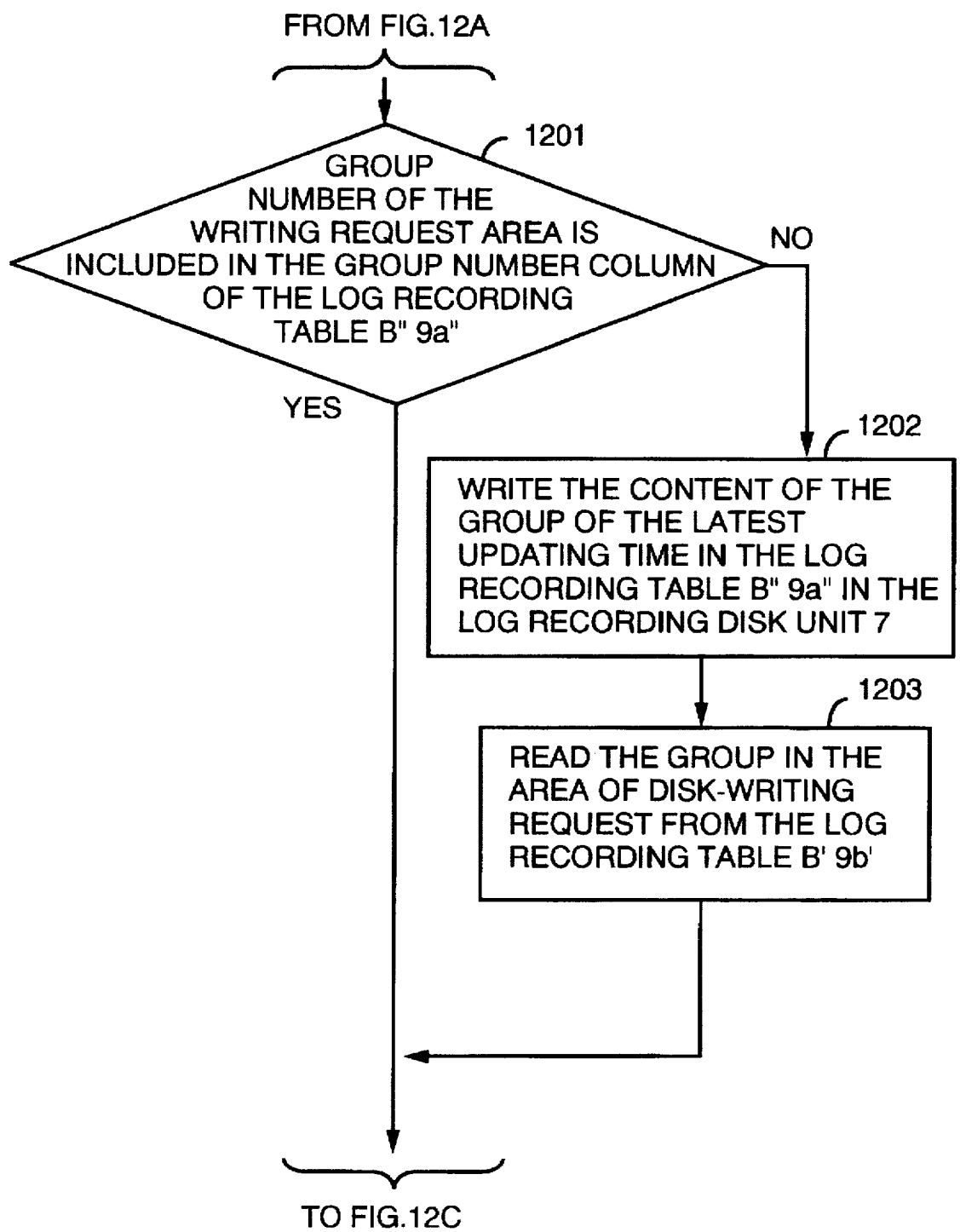
Figure 12C:
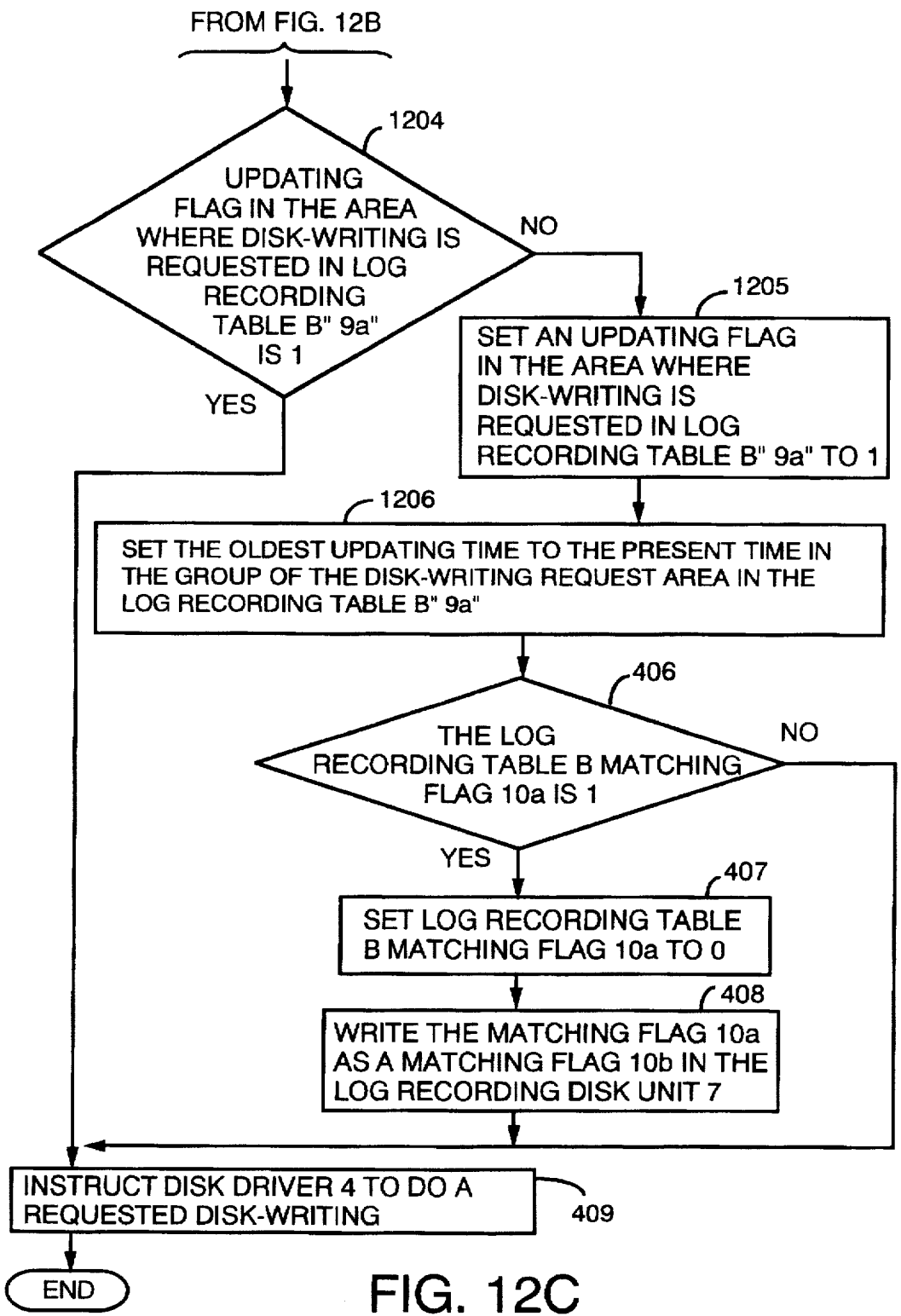

An operation of the log recording driver 6 is explained using a flow chart of FIG. 12. First of all, after having carried out the steps 401, 402, and 403 by the log recording table A updating means 11, the log recording driver 6 calls for the log recording table B" updating means 12" in the same manner as that of the embodiments mentioned so far.

The log recording table B" updating means 12" gives reference to the group number column in the log recording table B" 9a" and confirms whether there is an updating flag for the group in the area to which the disk writing is requested (step 1201). If desired group in the log recording table B' 9b' has not been written in the log recording table B" 9a", the contents of the updating flags in the oldest updated group in the log recording table B" 9a" are written into the log recording disk B' 9b' in the log recording disk unit 7 (step 1202). For filling in the blank made in the log recording table B" 9a", the contents of the updating flag of the group in the area to which the disk writing is requested are read out from the log recording table B' 9b' (step 1203).

At this stage, it is confirmed that the area to which the disk writing is requested is read out in the log recording table B" 9a". Therefore, it is confirmed whether an updating flag in the area, to which the disk writing is requested, in this log recording table B" 9a" is set to "1" or not (step 1204). If the updating flag is not "1", namely none of the updating has been done yet, the updating flag in the area, to which the disk writing is requested, in the log recording table B" 9a" is set to "1" (step 1205). Also, the latest updating time is changed into the present time with regard to the group in the area to which the disk writing is requested (step 1206).

The log recording driver 6 then calls for the log recording table B matching flag updating means 13 to carry out the updating steps 406, 407 and 408. Finally, the log recording driver 6 requests the disk driver 4 to carry out the requested disk writing process (step 409).

Figure 13:
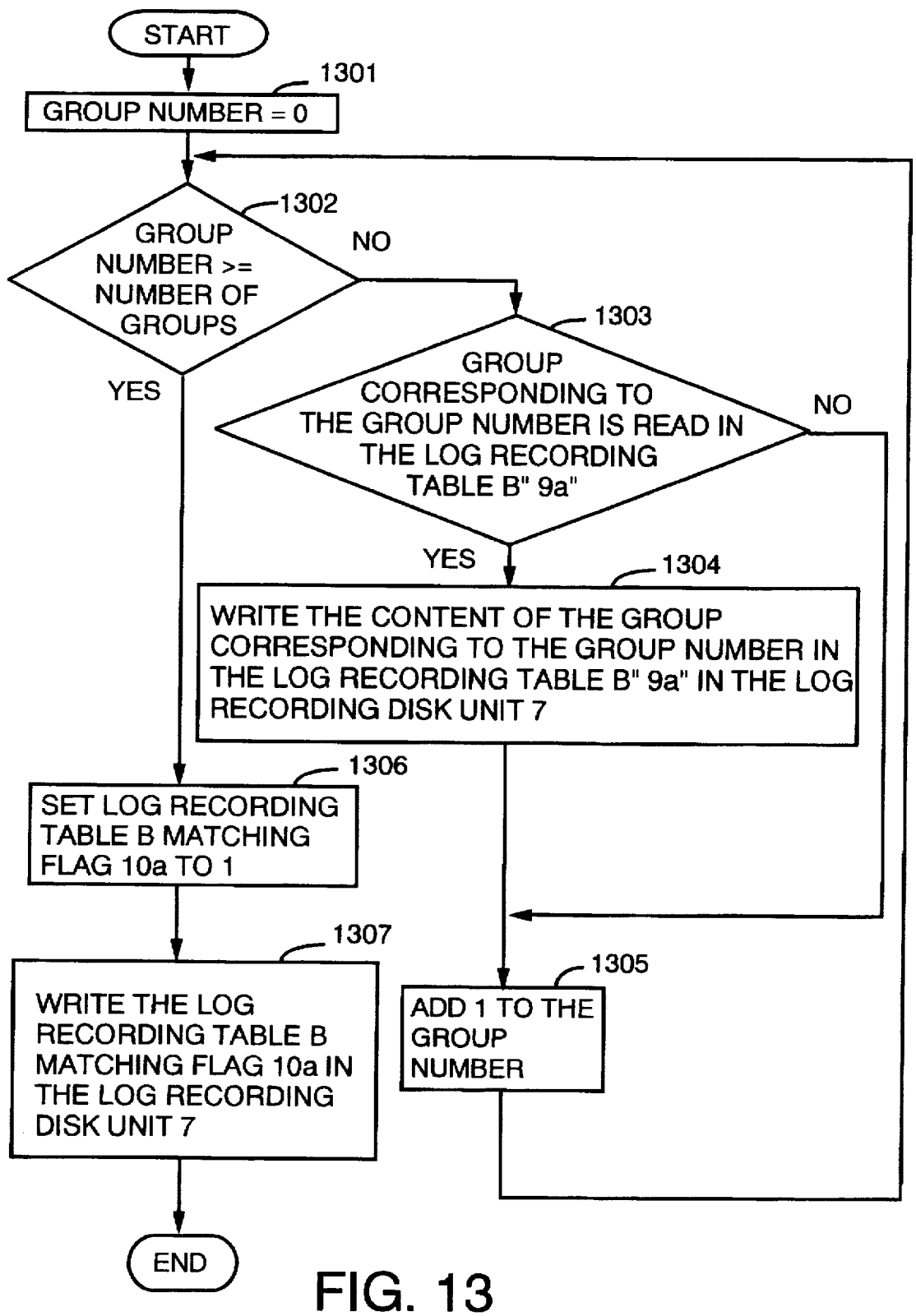
FIG. 13 is a flow chart showing an operation of a recording table B" identifying means according to the third embodiment of the present invention.

The log recording table B" identifying means 14" is explained using a flow chart of FIG. 13. When receiving a request for identifying, the log recording table B" identifying means 14" initializes the group numbers, which are necessary to be identified, to "0" (step 1301). When the above-mentioned group number, which are necessary to be identified, is less than the number of the groups (step 1302), the log recording table B" identifying means 14" confirms whether the group of the group number, which are necessary to be identified, is written in the log recording table B" 9a" in the order of the group number (step 1303). If the group is written in the log recording table B" 9a", the updating flags of the groups in the log recording table B" 9a" corresponding to the group numbers, which are necessary to be identified, is written into the log recording disk unit 7 (step 1304).

After then, the group number of the groups which are necessary to be identified is added by "1" (step 1305), and the process then goes back to the step 1302. When the above-mentioned group number of the groups, which are necessary to be identified is directed, is more than the group number (step 1302), a flag "1" is then set in the log recording table B matching flag 10a (step 1306). Then the log recording table B matching flag 10a is written into the log recording disk unit 7 (step 1307).

The effect of the present embodiment is explained below. The difference of the present embodiment from the first embodiment lies in that the log recording table B" 9a" is provided which is made smaller than the log recording table B 9a. According to this embodiment, the disk unit 5 is divided into 1000 areas to record updating flags. Therefore, the capacity occupied by the updating flags is at least 1000 bits. However, when updating flags are recorded by a smaller area unit in general, or when a log recording is made for a larger capacity or for a lot of disk units, the log recording table B 9a needs a large capacity. For example, if the updated flags in the disk unit of 4 GB is recorded by a unit of 4 KB (block size) as is often used in the data base management system, the log recording table B 9a needs a capacity of 1M bits. Further, more of the table capacity is necessary when a plurality of the disk units are used. This restricts the capacity in the main memory available for software on the computer system 1, since this log recording table B 9a is always placed in the main memory.

By the introduction of the log recording table B" as shown in this embodiment, the capacity in the main memory can be always held within a certain constant value, regardless to the capacity of the disk unit or the area size managed by means of updating flags. Especially, for example, in case the updating area in the disk unit 5 is deviated such that major task is a insertion process or a batch job is performed only to the specified tables, the updating group in the log recording table B' 9b' is restricted. Therefore, if the number of the groups written in the log recording table B" 9a" is appropriately selected, it barely necessitates the input and output between the log recording table B' 9b' and the log recording table B" 9a" in the log recording disk unit 7. This realizes the reduction in the amount of the main memory without increasing overhead.

Embodiment 4

Figure 14:
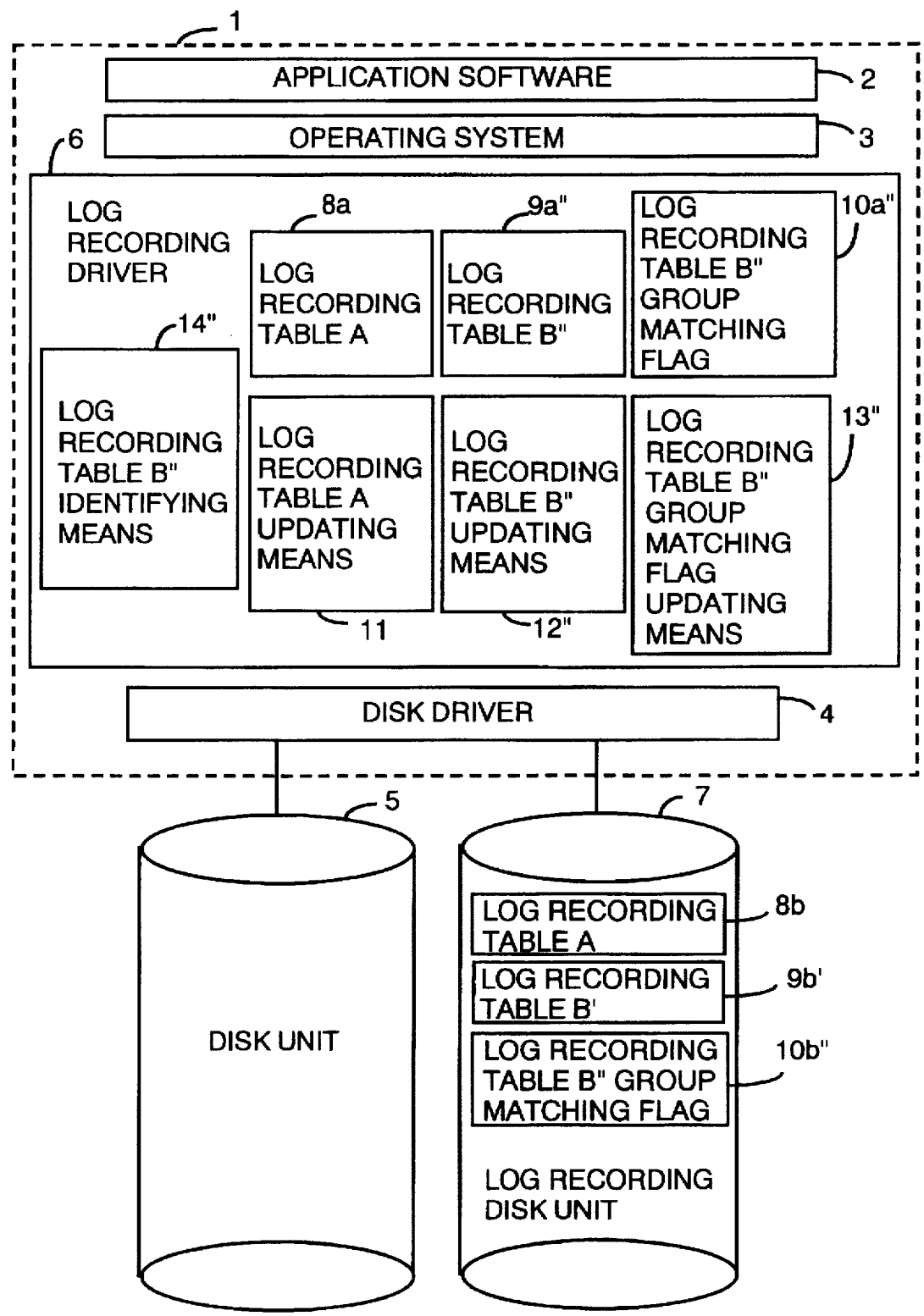
FIG. 14 is a block diagram of a system according to a fourth embodiment of the present invention.
Figure 15A:
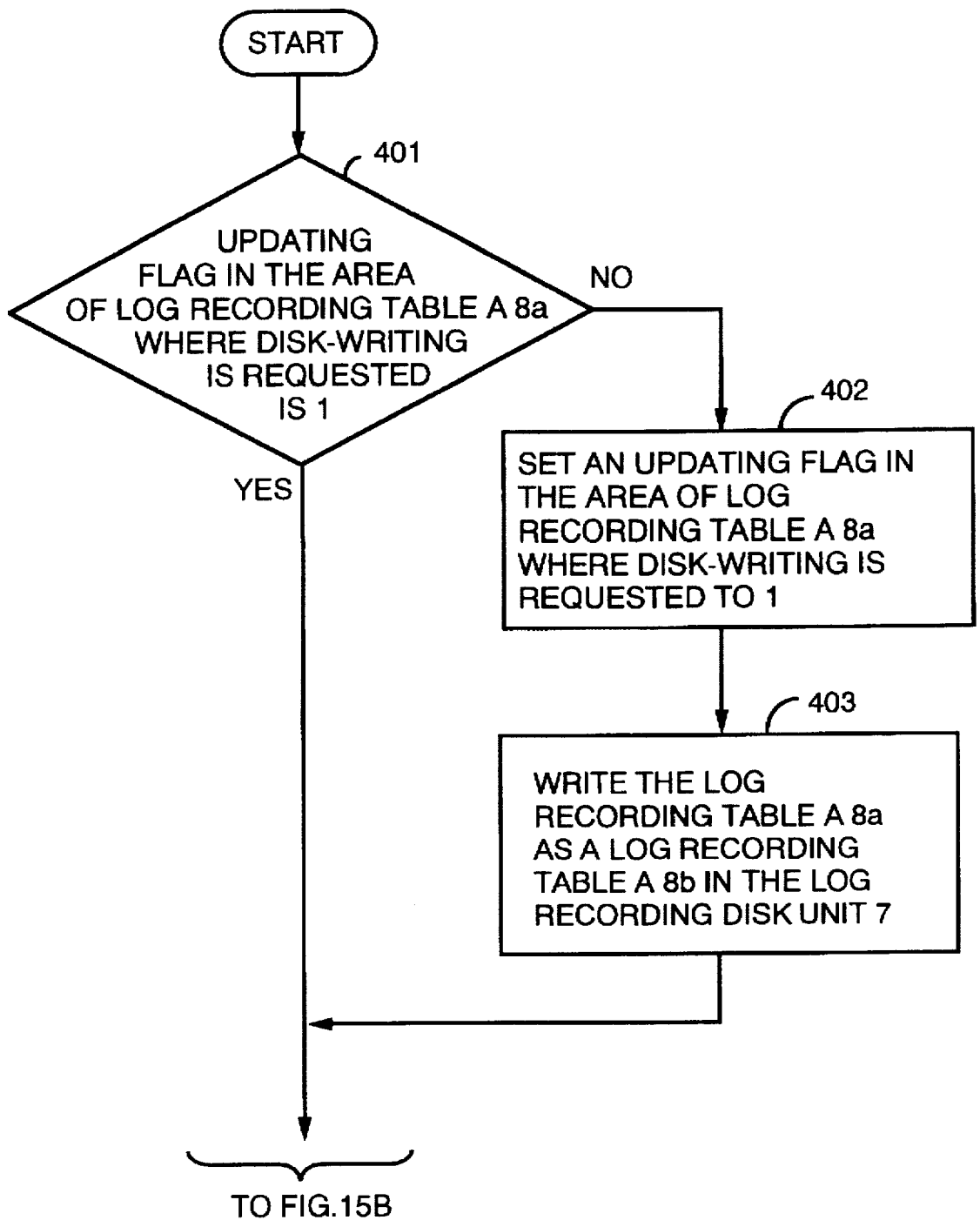
FIGS. 15A, 15B, 15C are flow charts showing an operation of a log recording driver according to the fourth embodiment of the present invention.
Figure 15B:
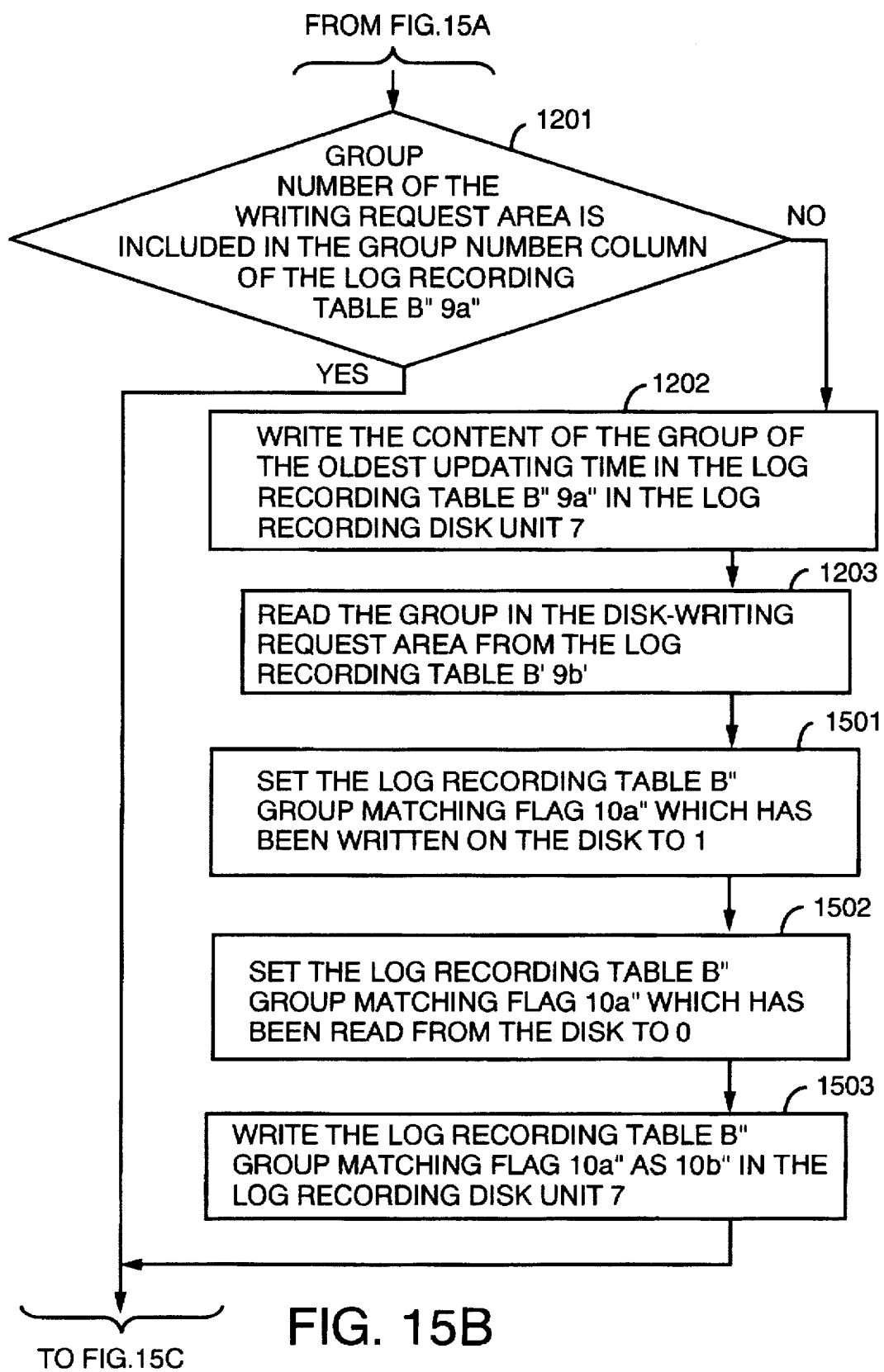
Figure 15C:
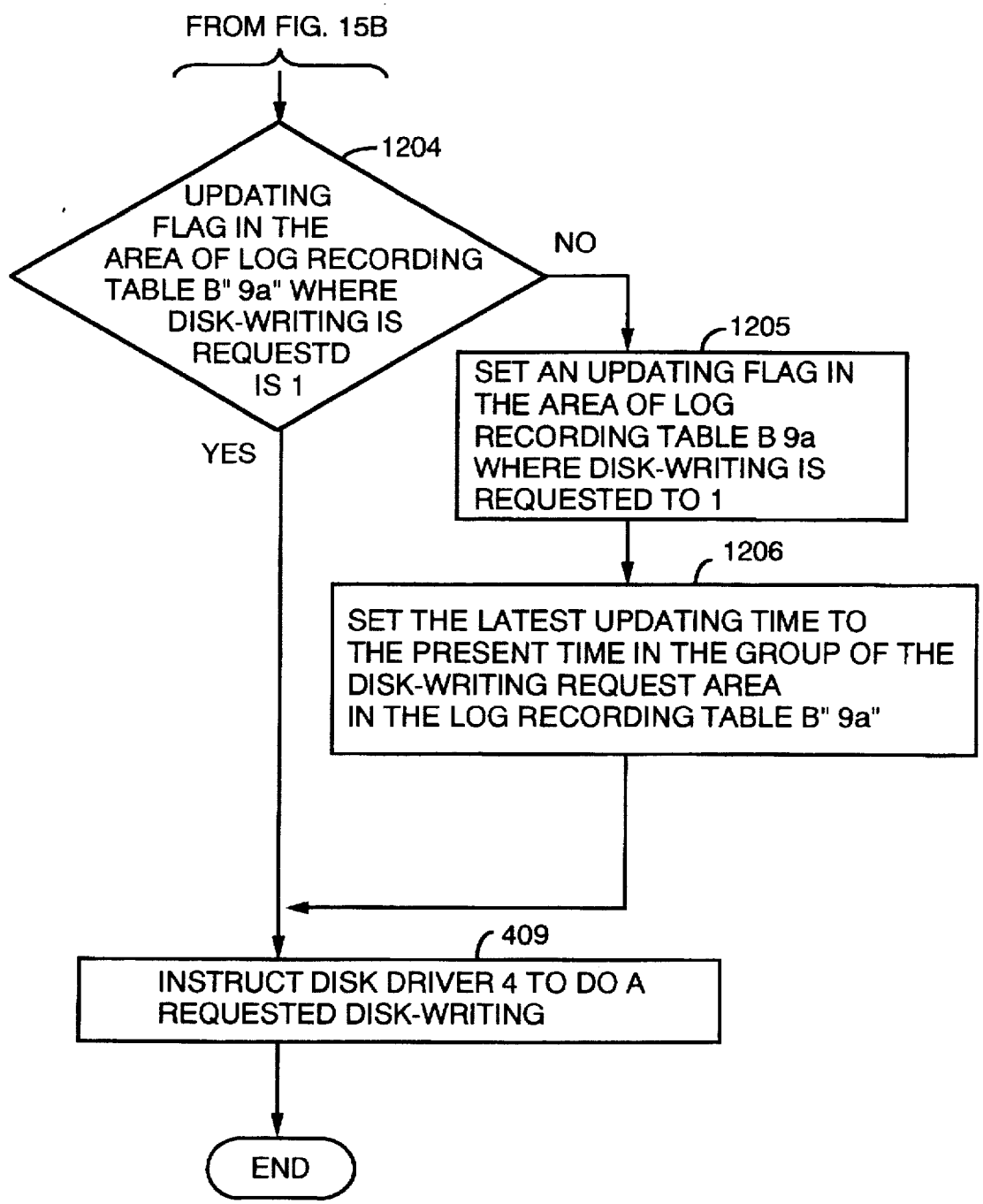

A fourth embodiment of the present invention is explained using FIG. 14 and FIG. 15. FIG. 14 is a block diagram showing a system configuration of the present embodiment. Compared with the system of FIG. 10, the log recording table B' group matching flags 10a' and 10b' of FIG. 10 are replaced respectively by the log recording table B" group matching flags 10a" and 10b" which have the same configuration as that of the log recording table B' group matching flag 702 of FIG. 7. The log recording table B matching flag updating means 13 is also replaced by the log recording table B" group matching flag updating means 13".

As mentioned above, the log recording tables B" group matching flag has the same configuration as that of the log recording table B' group matching flag 702. When the flag indicates "1", there is no log recording table B' 9b' of the corresponding group in the main memory device. In other words, the contents of that group have not been yet read in the log recording table B" 9a". This means that the contents of corresponding group of the log recording table B' 9b' is reliable. When the flag indicates "0", the log recording table B' 9b' in the corresponding group exists in the main memory device. In other words, the log recording table B' 9b' is written in the log recording table B" 9a". This means that the contents of that the log recording table B' 9b' are not reliable.

An operation of the log recording driver 6 is explained using a flow chart of FIG. 15. First of all, after having carried out the steps 401, 402, and 403 by the log recording table A updating means 11, the log recording driver 6 calls for the log recording table B" updating means 12" in the same manner as that of the embodiments mentioned so far.

The log recording table B" updating means 12" gives reference to the group number column in the log recording table B" 9a" and confirms whether there is an updating flag for the group in the area to which the disk writing is requested (step 1201). If desired group in the log recording table B' 9b' has not been written in the log recording table B" 9a", the contents of the updating flags in the oldest updated group in the log recording table B" 9a" is written into the log recording disk B' 9b' in the log recording disk unit 7 (step 1202). For filling in the blank made in the log recording table B" 9a", the contents of the updating flag of the group in the area to which the disk writing is requested are read out from the log recording table B' 9b' (step 1203).

At this stage, the log recording driver 6 temporarily calls for the log recording table B" group matching flag updating means 13". The log recording table B" group matching flag updating means 13" sets matching flags in the log recording table B" group matching flag 10a" in the group which includes the updating flags written in the disk to "1" (step 1501), while the log recording table B" group matching flag updating means 13" sets a matching flag in the log recording table B" group matching flag 10a" in the group which includes the updating flags read out from the disk to "0" (step 1502). The log recording table B" group matching flag 10a" is then written into the log recording disk unit 7 as a log recording table B" group matching flag 10b" (step 1503).

Here, the focus of the process comes back to the log recording table B" updating means 12". At this stage, it is confirmed that the area to which the disk writing is requested is read out in the log recording table B" 9a". Therefore, it is confirmed whether an updating flag in the area, to which the disk writing is requested, in this log recording table B" 9a" is set to "1" or not (step 1204). If the updating flag is not "1", namely none of the updating has been done yet, the updating flag in the area, to which the disk writing is requested, in the log recording table B" 9a"is set to "1" (step 1205). Also, the latest updating time is changed into the present time with regard to the group in the area to which the disk writing is requested (step 1206). Finally, the log recording driver 6 requests the disk driver 4 to carry out the requested disk writing process (step 409).

The difference of the present embodiment from the embodiment 3 lies in the introduction of the log recording tables B" group matching flags. Accordingly, this realizes a system which is highly durable to failure, in the same manner mentioned in the embodiment 2.

Embodiment 5

Figure 16:
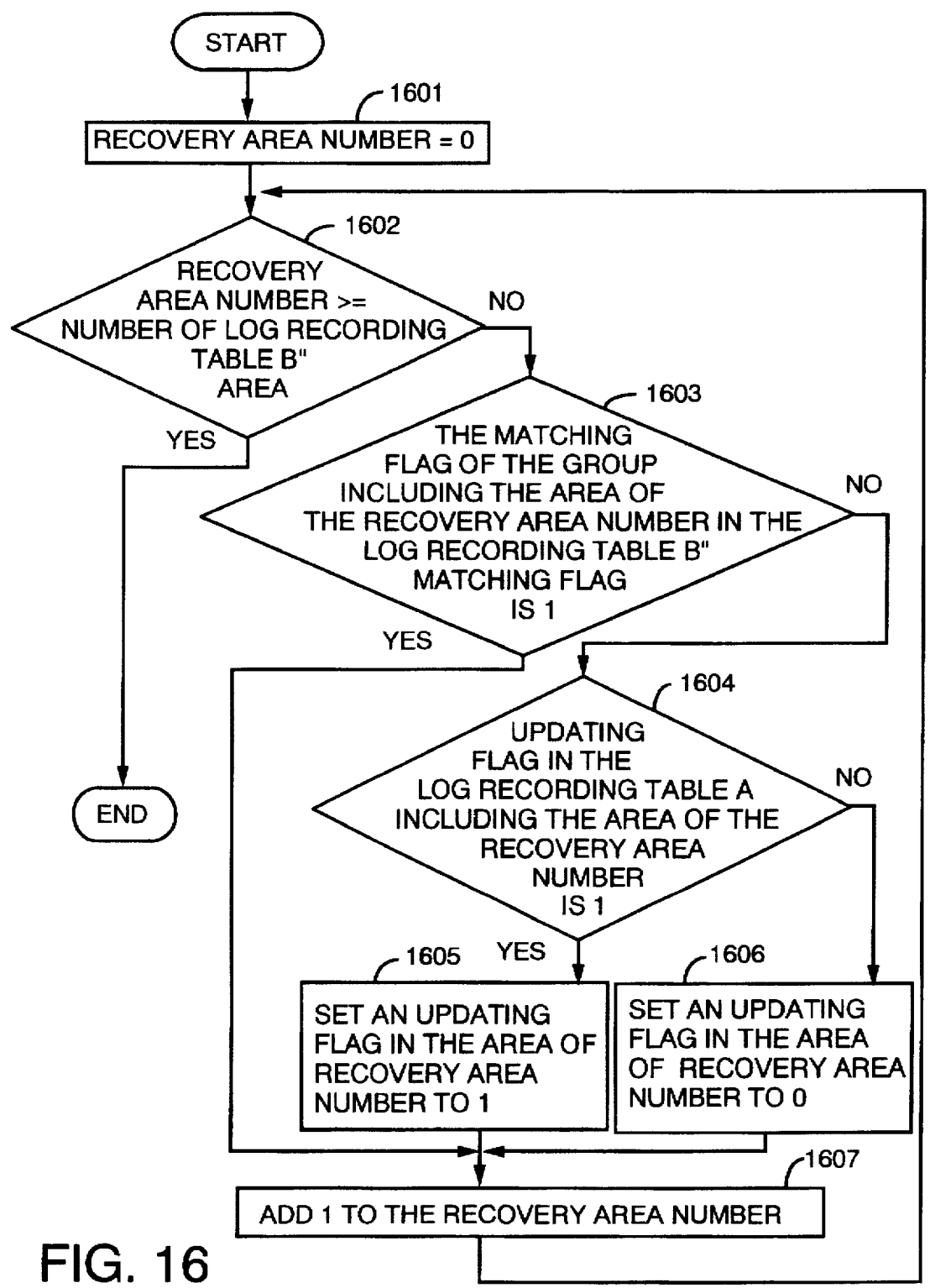
FIG. 16 is a flow chart showing an operation of a log recording table B" recovery means according to a fifth embodiment of the present invention.

A fifth embodiment of the present invention is explained using FIG. 16. The configuration of the present embodiment comprises a log recording tables B" recovery means in addition to the log recording driver 6 of the second embodiment or the fourth embodiment.

When a part of the log recording table B" becomes unusable due to sudden abnormal cease of the computer system 1, the log recording table B" recovery means of the present embodiment recovers the log recording table B" by using the log recording table A and continuously performs the log recording using the log recording table B".

The recovery operation of the log recording table B" is explained using a flow chart of FIG. 16. First of all, the area number to which the recovery is requested is set to "0" (step 1601). If that recovery area number is less than the number of areas in the log recording table B" (step 1602), the log recording table B" recovering means confirms whether the matching flag of the groups which includes the area of recovery area number in the log recording table B" is "1" or not (step 1603). If the matching flag is not "1", that is "mismatched", the log recording table B" recovering means then confirms whether the updating flag in the log recording table A including the area of the recovery area number is "1" or not (step 1604). If the flag is "1", namely, the updating has been carried out, updating flag in the area of the recovery area number of the log recording table B" is set to "1", that is, to the updating state (step 1605). Otherwise, the updating flag in the area of the recovery area number is set to "0", that is, to "non-updated state" (step 1606).

Then, "1" is added to the recovery area number (step 1607), and then the process goes back to the step 1602. If the recovery area number is more than that of the area number in the log recording table B" (step 1602), the recovery process in the log recording table B" comes to an end.

According to this embodiment, it is possible to continuously perform the disk updating recording after an outbreak of a failure. For example, it is assumed that the computer system 1 is operating under the circumstances mentioned in the second embodiment. If a failure occurs on Thursday and the recovery means introduced to the present embodiment is used, the area included in the group of the log recording table B" which was not matched when the accident broke out is backed up as precisely as the log record table A at the time of the back-up on that weekend. Further, the area included in the group of the log recording table B" which was matched is backed up as precisely as the log record table B" in the same manner as the failure did not occurred. Although the back up process is rather inferior to that of the ease where no accident occurs, the amount of the data back up is reduced as a whole.

Embodiment 6

Figure 17A:
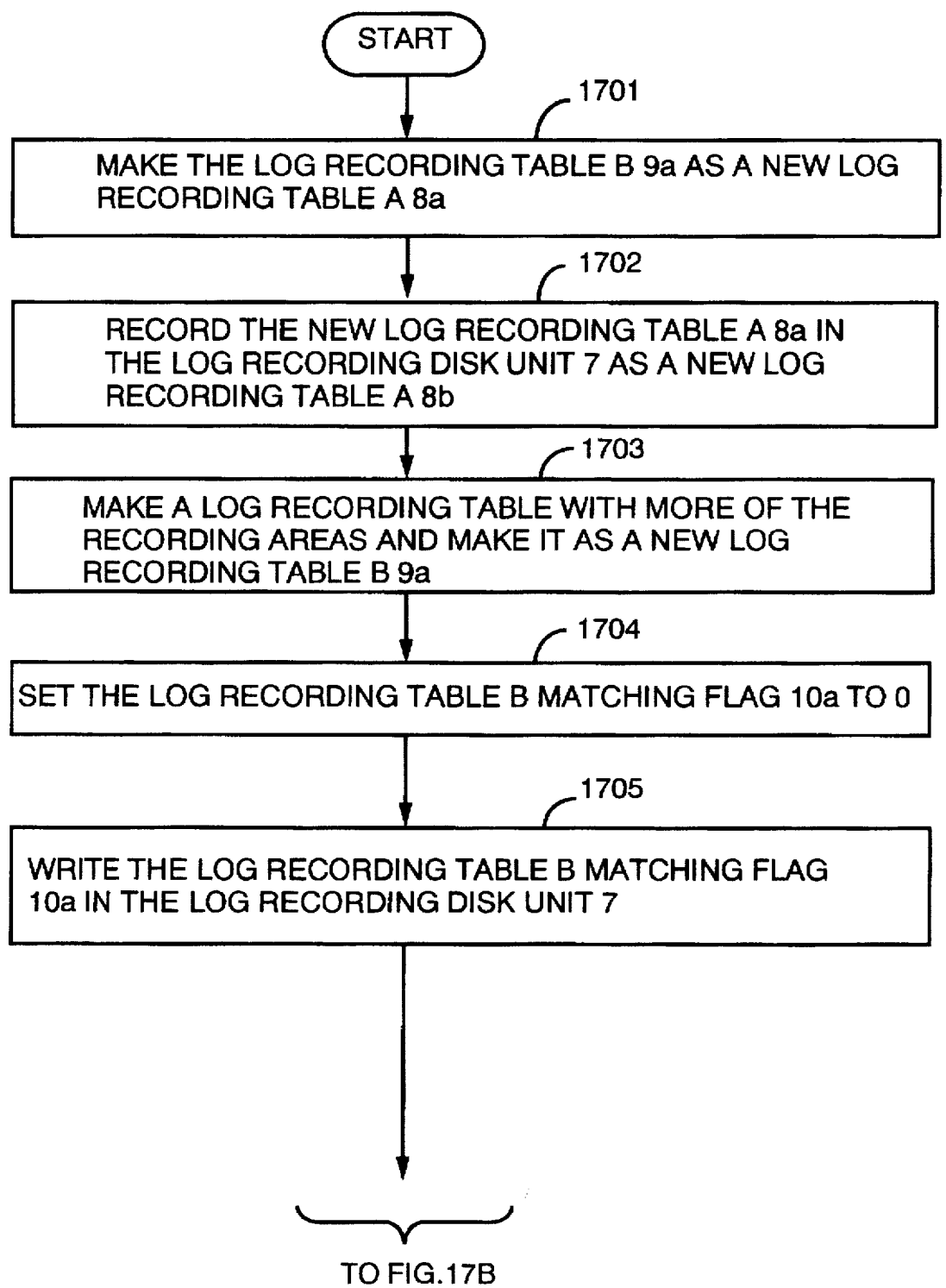
FIGS. 17A, 17B are flow charts showing an operation of a log recording table extension means according to a sixth embodiment of the present invention.
Figure 17B:
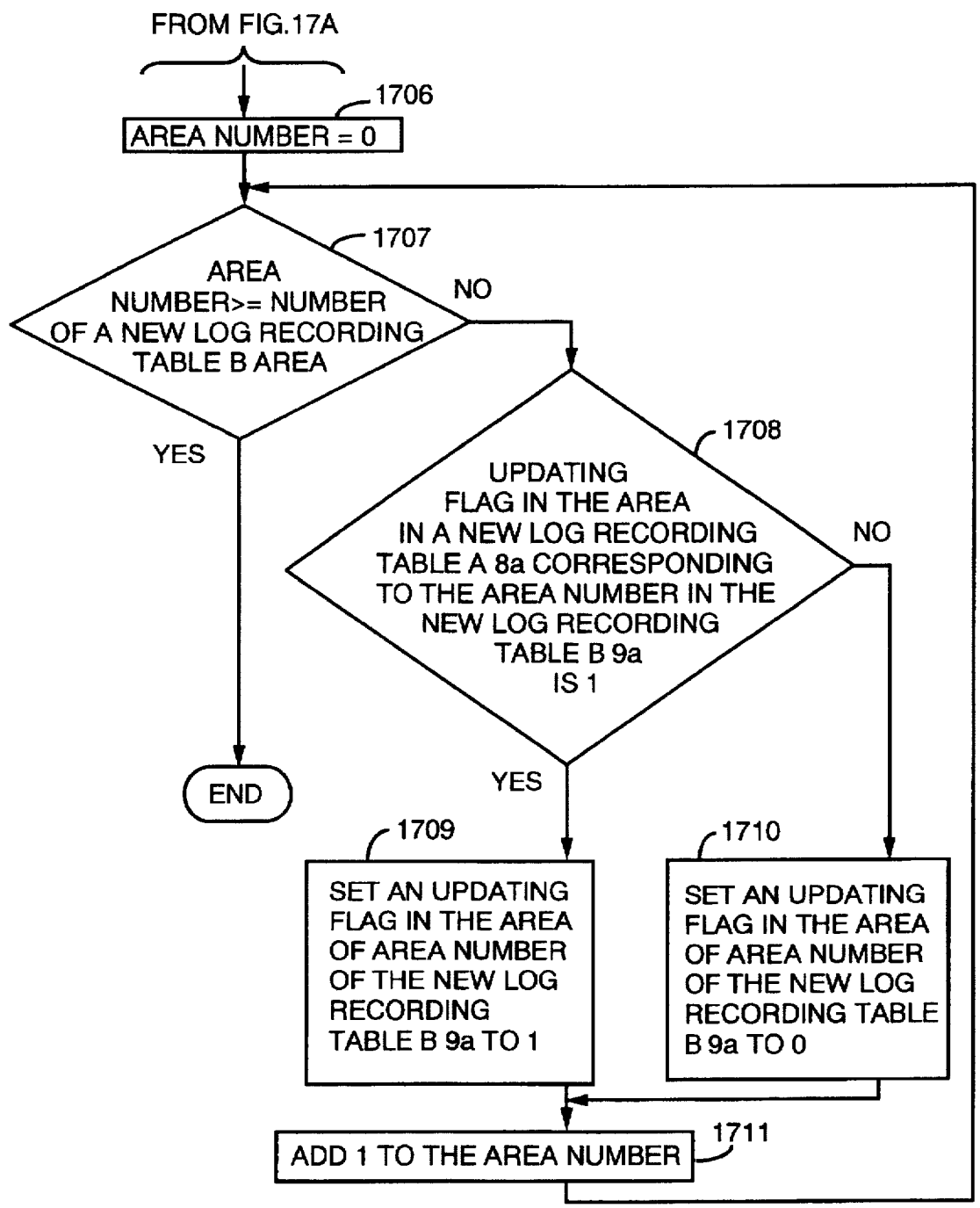

A sixth embodiment of the present invention is explained using FIG. 17. The configuration of the present sixth embodiment comprises a log recording table extension means for extending the log recording table A and the log recording table B in addition to the log recording driver 6 in FIG. 1.

An operation of the embodiment is explained using a flow chart shown in FIG. 17. When receiving a log recording table extension request from host software, the log recording table extension means in the log recording driver 6 uses the log recording table B 9a as a log recording table A 8a (step 1701), and writes the log recording table A 8a into the log recording disk unit 7 as a log recording table A 8b (step 1702). This completes the extension of the log recording table A, using the log recording table B.

The log recording table extension means in the log recording driver 6 makes a new log recording table B 9a by making a smaller recording unit area (400 KB, for example) than the original log recording table B 9a, namely the new log recording table A 8a (step 1703), then sets the log recording table B matching flag 10a to "0" (step 1704), and then writes it into the log recording disk unit 7 as a log recording table B matching flag 10b (step 1705).

The log recording table extension means makes a new log recording table B 9a by setting the area number in the area where the updating flag is to be set to "0" (step 1706), if the area number which the updating flag is to be set is less than the number of area in the new log recording table B 9a (step 1707), the log recording table extension means confirms whether an updating flag in a new log recording table A 8a corresponding to the area number where the updating flag is to be set is set to "1" (step 1708). If the updating flag is "1", the updating flag in the area in the log recording table B 9a where the updating flag is to be set is set to "1" (step 1709). Otherwise, the updating flag is set to "0" (step 1710).

When the updating flag has been set in that area, the area number of that area is incremented by "1" (step 1711), and then the process goes back to the step 1707. If the area number is equal or more than the number of areas in the new log recording table B 9a (step 1707), the process of the log recording table extension means comes to an end.

The effect of the present embodiment is explained below. According to the embodiments mentioned so far, a log recording driver is introduced to reduce the amount of data back up. Also, it is assumed that the log recording table A is a table having 100 areas, and the log recording table B is a table having 1000 areas.

The object of the present embodiment is to realize a detailed log recording with a small amount of overhead, but not to eliminate the overhead to "0". Therefore, if the log recording table has lots of areas, there is some operational problems. However, if the area number to be managed is too small, there is some fears that the amount of data back up may not be sufficiently reduced.

Accordingly, it is preferable to use a log recording table with a suitable number of areas. According to the present embodiment, an appropriate number of the area can be set during an operation in accordance with the operation type of the system. For example, when a manager of the computer system 1 judges that the reduction of the amount of the data back up should be prior to the reduction of overhead, it does not necessitates the setting of a new log recording table from the beginning, but rather it enables the system to extend the log recording tables without ceasing an operation, which makes it possible to reduce the amount of the data back up.

Embodiment 7

Figure 18:
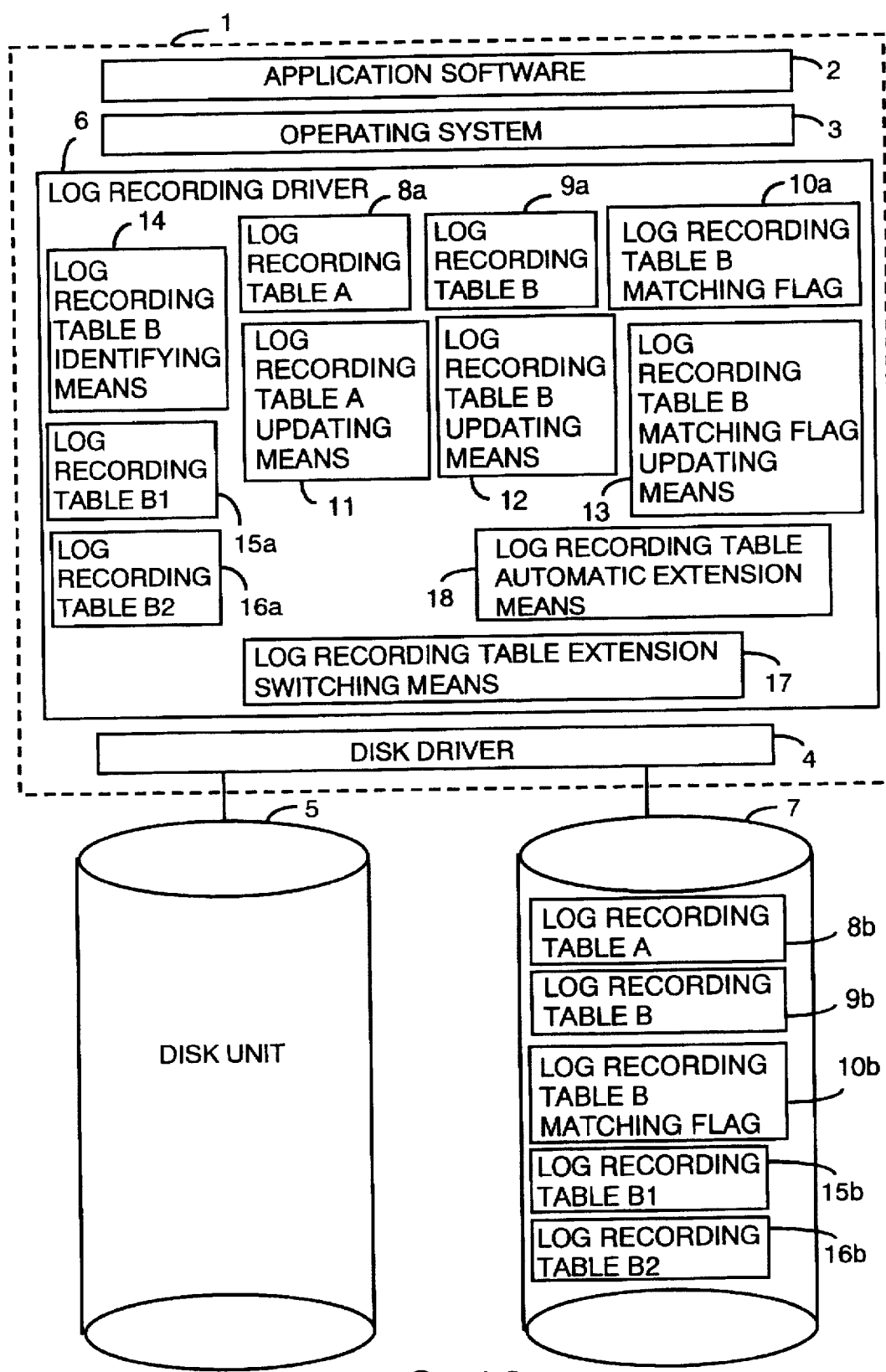
FIG. 18 is a block diagram of a system according to a seventh embodiment of the present invention.
Figure 19A:
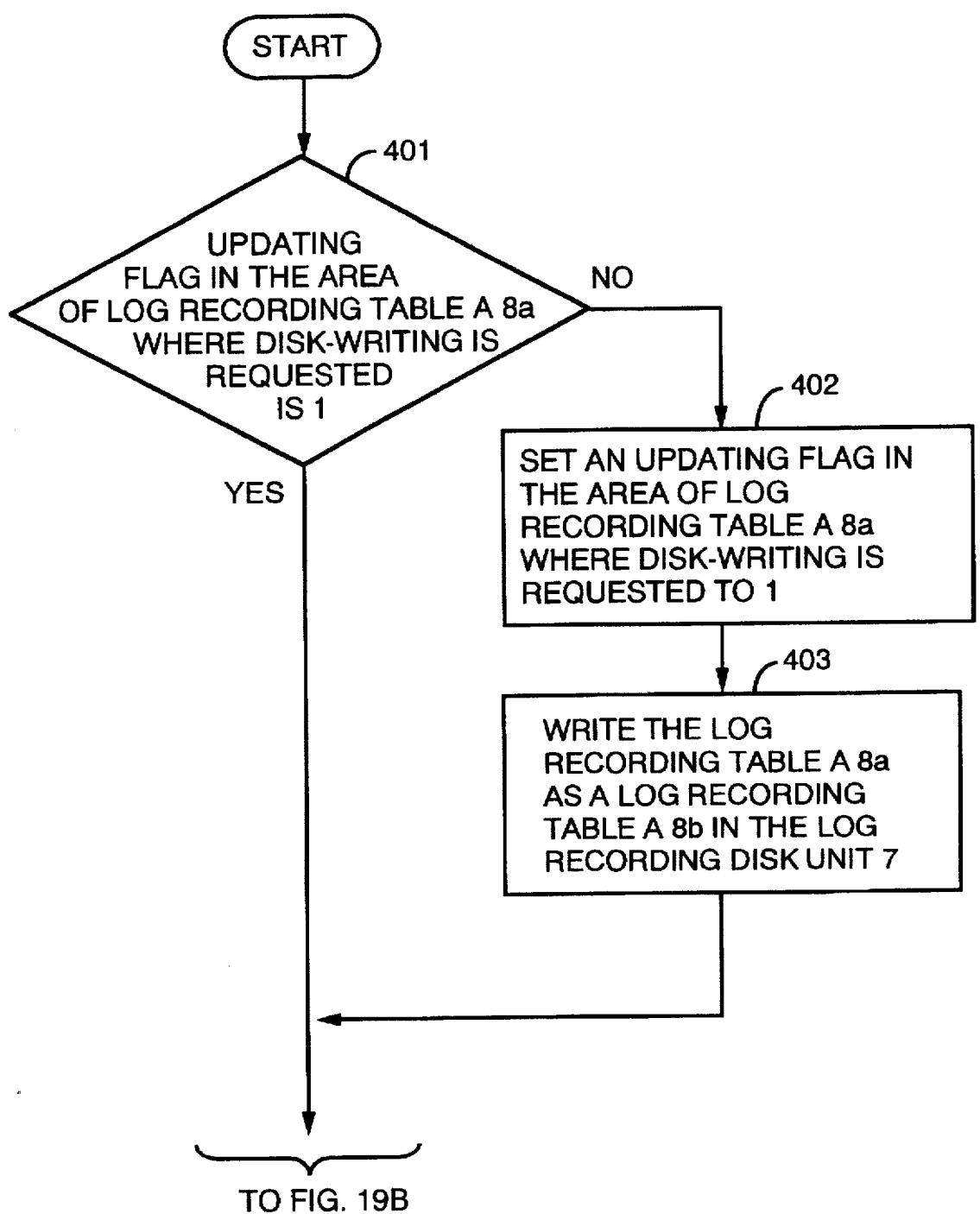
FIGS. 19A, 19B, 19C, 19D are flow charts showing an operation of a log recording driver according to the seventh embodiment of the present invention.
Figure 19B:
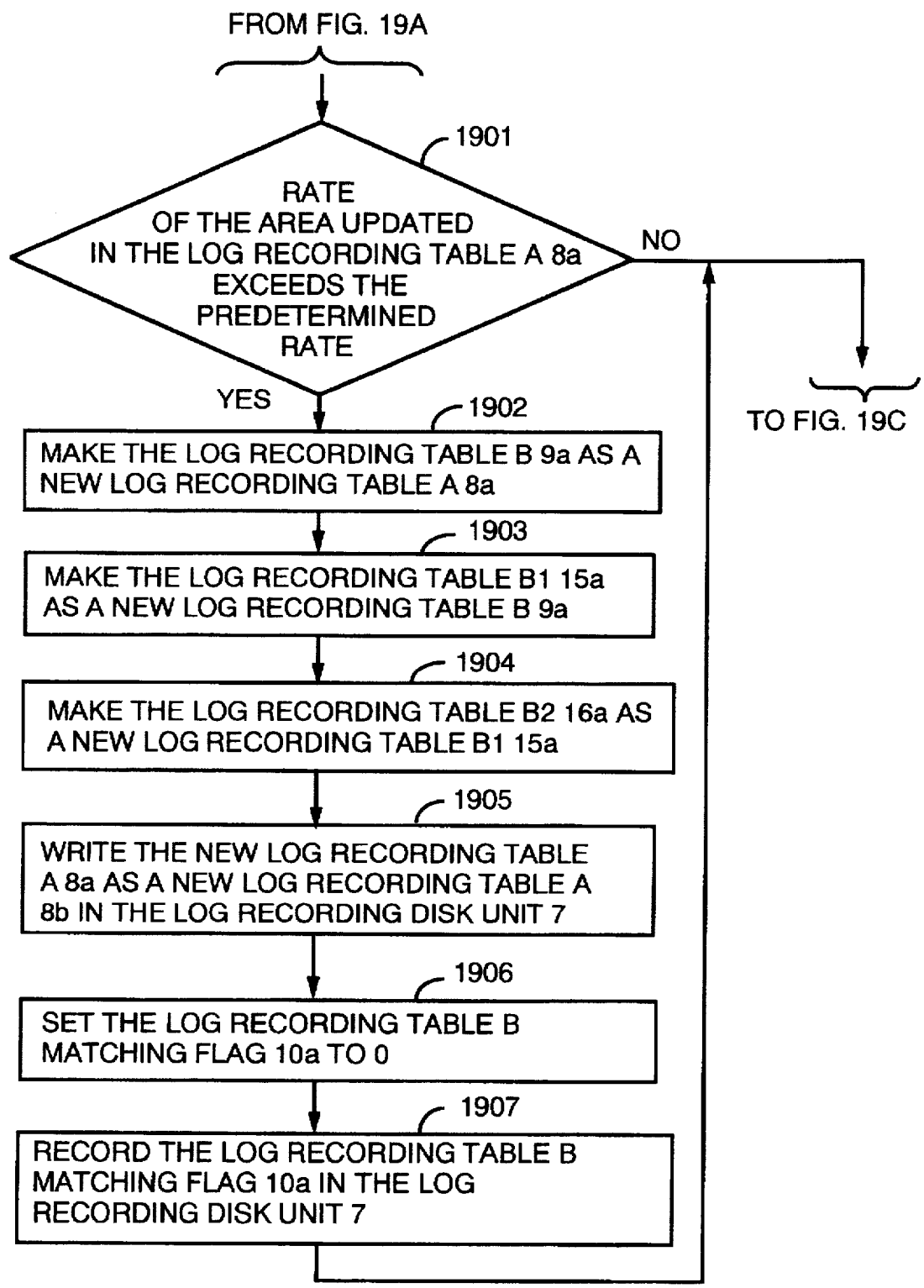
Figure 19C:
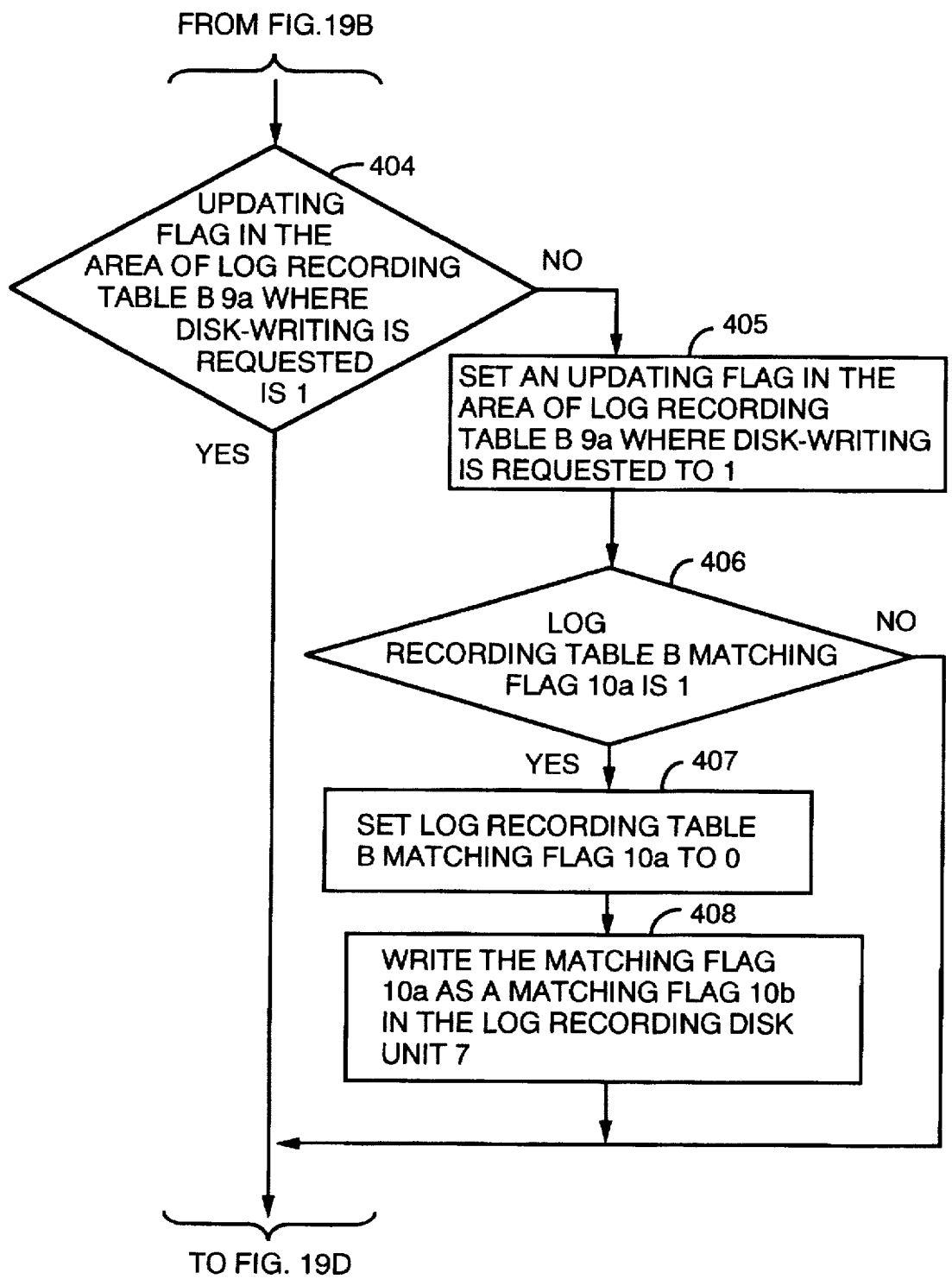
Figure 19D:
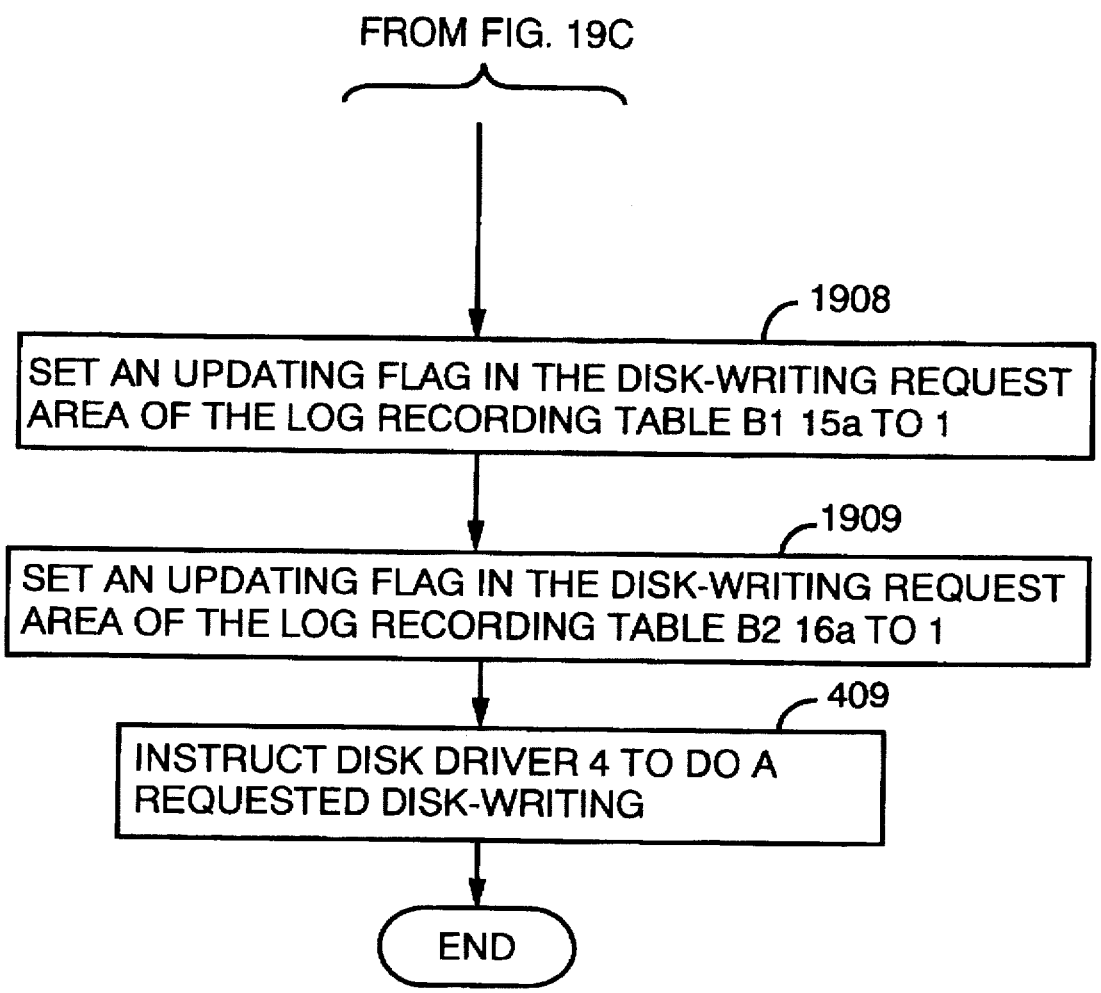

A seventh embodiment of the present invention is explained using FIG. 18 and FIG. 19. FIG. 18 is a block diagram showing a configuration of this embodiment. In this embodiment, the system further comprises a log recording table B1 15a in the log recording driver 6, whose area size of the recording unit is smaller than that of the log recording table B 9a in the log recording driver 6, namely, the number of area is larger than the log recording table B 9a, and an image 15b of that log recording table B1 15a in the log recording disk unit 7. The system further comprises a log recording table B2 16a in the log recording driver 6, whose area size of the recording unit is further smaller than that of the log recording table B1 and its image 16b in the log recording disk unit 7.

Also in FIG. 18, the system comprises a log recording table extension switching means 17 and a log recording table automatic extension means 18 in the log recording driver 6. In this embodiment, it is assumed that the number of areas is 100, 1000, 10000 and 100000 for the log recording table A, B, B1 and B2, respectively.

An operation of the log recording driver 6 is explained using a flow chart of FIG. 19. If there is a disk writing request, the log recording table A is updated by the log recording table A updating means 11 via the steps 401, 402, and 403 in the same manner as explained so far.

The log recording table automatic extension means 18 confirms in advance whether the rate of the updated areas in the log recording table A 8a is more than that indicated by host software (step 1901). If not, the log recording table B updating means 12 then updates the log recording table B via the steps 404, 405, 406, 407 and 408. The log recording table extension switching means 17 then sets an updating flag in the areas, to which the disk writing is requested, in the log recording table B1 15a to "1" (step 1908). Also, the log recording table extension switching means 17 sets an updating flag in the areas, to which the disk writing is requested, in the log recording table B2 16a to "1" (step 1909). Finally, log recording table extension switching means 17 requests the disk driver 4 to carry out the requested disk writing process (step 409).

On the other hand, if the rate of the updated areas in the log recording table A 8a is more than that indicated by host software (step 1901), the log recording table extension switching means 17 then makes the log recording table B 9a as a new log recording table A 8a (step 1902). Also, the log recording table extension switching means 17 makes the log recording table B1 15a as a new log recording table B 9a (step 1903), and makes the log recording table B2 16a as a new log recording table B1 15a (step 1904).

The log recording table extension switching means 17 then records the new log recording table A 8a into the log recording disk unit 7 as a new log recording table A 8b (step 1905). The log recording table extension switching means 17 then sets the log recording table B matching flag 10a to "0" (step 1906), and then writes the log recording table B matching flag 10a into the log recording disk unit 7 (step 1907), then calls for the log recording table B updating means 12.

Effects of the present embodiment are explained below. As mentioned above, when a log recording driver is introduced for reducing the amount of data back up, the amount of updated areas or the rate of the updated areas becomes important. If such rate of the updated areas is given as a reference from the host software to the log recording table extension means 18, the log recording table extension means 18 can automatically extend the log recording table according to the given reference. This makes it possible to support and control the desired reduction in the amount of data back up.

An introduction of the log recording table switching means 17 may increases overhead a little compared with the sixth embodiment. However, this eliminates the necessity to make a new log recording table B. Moreover, this makes it possible to use continuously a detailed log recording for transferring the more detailed log recording table B1 before being switched.

What is claimed is:

1. A disk updating log recording system comprising a log recording means for managing a record of updated portion of data in a disk unit, wherein, said log recording means comprises:

a first log recording table consisted of information areas which corresponds to a plurality of divided areas in said disk unit to record whether or not there is updating, and which is stored both in a main memory device and in the disk unit;

a second log recording table consisted of information areas, being smaller than those of said first log recording table, which corresponds to a plurality of divided areas in said disk unit to record whether or not there is updating, which is stored in both of said main memory device and said disk unit;

a log recording table matching flag which is stored in both of said main memory device and said disk unit for indicating whether or not said second log recording table in said main memory matches with said second log recording table in said disk unit to each other;

a first log recording table updating means for updating said first log recording table in said main memory, and for reflecting the resultant to said first log recording table in said disk unit;

a log recording table matching flag updating means for confirming whether or not said second log recording table in said main memory matches with said second log recording table in said disk unit according to said log recording table matching flag in said main memory, and for reflecting the resultant to said log recording table matching flag in said disk unit; and a log recording table identifying means for matching contents of said second log recording table in said main memory with those of said second log recording table in said disk unit.

2. The disk updating log recording system of claim 1, wherein areas managed by said second log recording table is divided into a plurality of groups, and said log recording table matching flag is constructed so that they correspond to said plurality of groups.

3. The disk updating log recording system of claim 1, wherein areas managed by said second log recording table is divided into a plurality of groups, and a recording table which constitutes a portion of said divided group is located in said main memory in order that a portion of said recording table of whole said disk areas is written in said main memory.

4. The disk updating log recording system of claim 3, wherein areas managed by said second log recording table is divided into a plurality of groups, and a flag is arranged which indicates whether or not recording information which constitutes said groups corresponding to respective groups is loaded into said main memory.

5. The disk updating log recording system of claim 2, further comprising:

a log recording table recovery means for said second log recording table;

said log recording table recovery means keeps contents of said second log recording table in said disk unit as it is if the contents of said groups in said main memory are the same as those of said groups in said disk unit, and said log recording table recovery means recovers said second recording table with reference to said first log recording table if the contents of said groups in said main memory are different from those of said groups in said disk unit.

6. The disk updating log recording system of claim 4, further comprising:

a log recording table recovery means for said second log recording table;

said log recording table recovery means keeps contents of said second log recording table in said disk unit as it is if the contents of said groups in said main memory are the same as those of said groups in said disk unit, and said log recording table recovery means recovers said second recording table with reference to said first log recording table if the contents of said groups in said main memory are different from those of said groups in said disk unit.

7. The disk updating log recording system of claim 1, further comprising:

a log recording extension means with connection to said first log recording table and said second log recording table;

said log recording extension means substitutes contents of said first log recording table by contents of said second log recording table, which reconstructs contents of said second log recording table to be recorded by a smaller recording unit than the former contents.

8. The disk updating log recording system of claim 2, further comprising:

a log recording extension means with connection to said first log recording table and said second log recording table;

said log recording extension means substitutes contents of said first log recording table by contents of said second log recording table, which reconstructs contents of said second log recording table to be recorded by a smaller recording unit than the former contents.

9. The disk updating log recording system of claim 1, further comprising:

at least a third log recording table which have a smaller recording unit than said second recording table; and a log recording table extension means;

said log recording extension means makes contents of said second log recording table as those of the first log recording table, said third log recording table which has a smaller recording unit than said second log recording table as the second log recording table, according to a log recording table extension demand.

10. The disk updating log recording system of claim 2, further comprising:

at least a third log recording table which have a smaller recording unit than said second recording table; and a log recording table extension means;

said log recording extension means makes contents of said second log recording table as those of the first log recording table, said third log recording table which has a smaller recording unit than said second log recording table as the second log recording table, according to a log recording table extension demand.

11. The disk updating log recording system of claim 7, wherein the extension process for a log recording table is automatically carried out, if a rate between an updated portion and a non-updated portion exceeds a predetermined rate in the log recording table.

12. The disk updating log recording system of claim 8, wherein the extension process for a log recording table is automatically carried out, if a rate between an updated portion and a non-updated portion exceeds a predetermined rate in the log recording table.

13. The disk updating log recording system of claim 9, wherein the extension process for a log recording table is automatically carried out, if a rate between an updated portion and a non-updated portion exceeds a predetermined rate in the log recording table.

14. The disk updating log recording system of claim 10, wherein the extension process for a log recording table is automatically carried out, if a rate between an updated portion and a non-updated portion exceeds a predetermined rate in the log recording table.

* * * * *